US011375723B2

(12) United States Patent
Miller et al.

(10) Patent No.: US 11,375,723 B2
(45) Date of Patent: Jul. 5, 2022

(54) POWER OPERATED SCRIBE SAW

(71) Applicant: Bettcher Industries, Inc., Birmingham, OH (US)

(72) Inventors: Robert Miller, Elyria, OH (US); Bernard J. Esarey, Lorain, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 111 days.

(21) Appl. No.: 16/875,505

(22) Filed: May 15, 2020

(65) Prior Publication Data

US 2020/0367516 A1    Nov. 26, 2020

Related U.S. Application Data

(60) Provisional application No. 62/851,369, filed on May 22, 2019.

(51) Int. Cl.
*A22B 5/00*    (2006.01)
*B23D 45/16*   (2006.01)
(Continued)

(52) U.S. Cl.
CPC .......... *A22B 5/0047* (2013.01); *A22B 5/0029* (2013.01); *A22B 5/0035* (2013.01);
(Continued)

(58) Field of Classification Search
CPC ... A22B 5/0047; A22B 5/0035; A22B 5/0029; B23D 45/16; B23D 47/12; B23D 47/126;
(Continued)

(56) References Cited

U.S. PATENT DOCUMENTS 1,379,163 A  5/1921 Young
1,507,245 A  9/1924 Nankivell et al.
(Continued)

OTHER PUBLICATIONS

International Search Report and Written Opinion of the International Searching Authority dated Jul. 22, 2020 for PCT International Application No. PCT/US2020/033777, filed May 20, 2020. PCT International Application No. PCT/US2020/033777 claims priority from the present application. (9 pages).

*Primary Examiner* — Ghassem Alie
(74) *Attorney, Agent, or Firm* — Tarolli, Sundheim, Covell & Tummino LLP

(57) ABSTRACT

A power operated scribe saw including a head assembly affixed to a handle assembly. The head assembly includes a frame body, a drive train and a cutting blade. The drive train includes a worm driveshaft and worm rotating about a longitudinal axis of rotation and a blade driveshaft and worm gear rotating about a transverse axis of rotation, the cutting blade rotating with the blade driveshaft. The frame body includes a longitudinal throughbore and a transversely extending recess extending into a first side wall, the throughbore including a seating surface. A worm driveshaft support assembly supports the worm driveshaft for rotation and includes a first bearing engaging the worm drive shaft between the distal end of the worm driveshaft and the worm and a second bearing on the seating surface of the throughbore and engaging the worm drive shaft between the proximal end of the driveshaft and the worm.

20 Claims, 18 Drawing Sheets

(51) Int. Cl.
*B23D 47/12* (2006.01)
*F16H 1/16* (2006.01)

(52) U.S. Cl.
CPC .............. *B23D 45/16* (2013.01); *B23D 47/12* (2013.01); *F16H 1/16* (2013.01)

(58) Field of Classification Search
CPC .. F16H 1/16; F16H 2057/0213; F16H 57/021; B24B 23/02; Y10T 83/9397; Y10T 83/9372
USPC ............. 30/388, 376, 392; 83/666, 663, 860
See application file for complete search history.

(56) References Cited

U.S. PATENT DOCUMENTS

| | | | |
|---|---|---|---|
| 1,932,611 A | 10/1933 | Clarke | |
| 2,344,262 A | 3/1944 | Odierna et al. | |
| 3,197,808 A | 8/1965 | Mears | |
| 4,026,163 A * | 5/1977 | Merkert | F16H 1/16 74/425 |
| 4,071,923 A | 2/1978 | Smith | |
| 4,186,471 A | 2/1980 | Wehrmann et al. | |
| 4,451,953 A | 6/1984 | Leining | |
| 4,894,915 A | 1/1990 | Decker et al. | |
| 5,445,561 A | 8/1995 | Elmer | |
| 5,823,055 A * | 10/1998 | Siler | F16H 1/16 74/425 |
| 6,665,943 B1 | 12/2003 | Sloane et al. | |
| 7,163,453 B1 | 1/2007 | Gwyther | |
| 7,722,448 B2 | 5/2010 | Gwyther | |
| 7,963,829 B2 | 6/2011 | Gwyther | |
| 8,047,901 B2 | 11/2011 | Gwyther | |
| 8,806,761 B2 | 8/2014 | Whited et al. | |
| 8,905,827 B1 | 12/2014 | Ross | |
| 9,121,438 B2 | 9/2015 | Mascari | |
| 9,265,263 B2 | 2/2016 | Whited et al. | |
| 9,480,263 B2 | 11/2016 | Van Der Leest et al. | |
| 9,516,887 B1 | 12/2016 | Ewers | |
| 9,615,588 B2 | 4/2017 | Karubian | |
| 9,833,919 B2 | 12/2017 | Mascari et al. | |
| 9,913,482 B2 | 3/2018 | Karubian | |
| 10,034,480 B2 | 7/2018 | Grinaski | |
| 10,040,211 B2 | 8/2018 | Whited | |
| 10,136,584 B1 * | 11/2018 | Cours | A01G 3/085 |
| 10,405,558 B2 | 9/2019 | Chappell | |
| 10,731,713 B1 | 8/2020 | Gall et al. | |
| 2004/0216976 A1 | 11/2004 | Droste | |
| 2005/0217452 A1* | 10/2005 | McDonnell | B23D 47/126 83/663 |
| 2009/0223337 A1 | 9/2009 | Wikle et al. | |
| 2010/0275708 A1* | 11/2010 | Daniel | F16H 3/34 74/405 |
| 2013/0081288 A1* | 4/2013 | Holba | B23D 59/00 30/514 |
| 2013/0104404 A1 | 5/2013 | Levsen | |
| 2014/0236180 A1 | 8/2014 | Shafirstein et al. | |
| 2016/0031103 A1 | 2/2016 | Mascari et al. | |
| 2017/0142985 A1 | 5/2017 | Chappell, Jr. | |
| 2018/0162002 A1 | 6/2018 | Whited et al. | |
| 2018/0345514 A1 | 12/2018 | Whited et al. | |
| 2019/0069564 A1 | 3/2019 | Sukey | |

* cited by examiner

POWER OPERATED SCRIBE SAW

CROSS REFERENCE TO RELATED APPLICATION

The following application claims priority under 35 U.S.C. § 119(e) to U.S. provisional patent application Ser. No. 62/851,369, filed May 22, 2019, entitled Power Operated Scribe Saw. The above-identified U.S. provisional patent application, namely, U.S. provisional patent application Ser. No. 62/851,369, is incorporated herein by reference in its entirety for any and all purposes.

TECHNICAL FIELD

The present disclosure relates to a power operated scribe saw used for splitting and trimming meat carcasses and meat products, the scribe saw is driven by a flexible shaft drive transmission coupled to an electric motor that is remote from the scribe saw.

BACKGROUND

Power operated scribe saws are used in the meat processing industry for splitting and trimming meat carcasses and meat products to remove skin from animal carcasses. Typically, the disk-shaped blade of such power operated scribe saws are driven by a pneumatic motor disposed in a handle of the saw. Pneumatic motors are typically more costly to operate and maintain as compared to an electric drive motor with similar output power. Moreover, as the pneumatic motor is located in the handle, the weight of the saw is necessarily increased by the weight of the pneumatic motor.

SUMMARY

In one aspect, the present disclosure relates to a power operated tool, such as a power operated scribe saw, comprising: an elongated handle assembly extending along a longitudinal axis of the handle assembly; a head assembly coupled to the handle assembly, the head assembly including a frame body, a drive train and a cutting blade assembly, including a cutting blade rotatably driven by the drive train about a cutting blade axis of rotation; the drive train including: a worm screw driveshaft rotating about a longitudinal drive shaft assembly axis of rotation, the worm screw driveshaft having a proximal end and a distal end; a worm screw extending radially from and rotating with the worm screw driveshaft, the worm screw positioned intermediate the proximal and distal ends of the worm screw driveshaft; a blade driveshaft including a first end and a second end and rotating about the cutting blade axis of rotation, the cutting blade coupled to and rotating with the blade driveshaft; a worm gear extending radially from and rotating with the blade driveshaft, the worm screw and worm gear operatively coupled such that rotation of the worm screw driveshaft about the longitudinal drive shaft assembly axis of rotation causes rotation of the blade driveshaft, the worm gear and cutting blade about the cutting blade axis of rotation; the frame body including a first side wall and a second side wall spaced apart by a front wall and a back wall, a through bore extending along a frame body longitudinal axis and a transversely extending recess extending into the first side wall in a direction toward the second side wall and opening into the through bore; a worm screw driveshaft support assembly disposed within the through bore and supporting the worm screw driveshaft for rotation about the longitudinal drive shaft assembly axis of rotation and including a first bearing support engaging at least a portion of the worm screw drive shaft extending between the distal end of the worm screw driveshaft and the worm screw and a second bearing support engaging at least a portion of the worm screw drive shaft extending between the proximal end of the driveshaft and the worm screw; and a blade driveshaft support assembly supporting the blade driveshaft for rotation about the cutting blade axis of rotation, at least a portion of the blade driveshaft support assembly being disposed within the transversely extending recess of the frame body.

In another aspect, the present disclosure relates to a power operated tool, such as a power operated scribe saw, comprising: an elongated handle assembly extending along a longitudinal axis of the handle assembly; a head assembly coupled to the handle assembly, the head assembly including a frame body, a drive train and a cutting blade assembly, including a cutting blade rotatably driven by the drive train about a cutting blade axis of rotation; the drive train including: a worm screw driveshaft rotating about a longitudinal drive shaft assembly axis of rotation, the worm screw driveshaft having a proximal end and a distal end; a worm screw rotating with the worm screw driveshaft, the worm screw positioned intermediate the proximal and distal ends of the worm screw driveshaft; a blade driveshaft including a first end and a second end and rotating about the cutting blade axis of rotation, the cutting blade coupled to and rotating with the blade driveshaft; a worm gear rotating with the blade driveshaft, the worm screw and worm gear operatively coupled such that rotation of the worm screw driveshaft about the longitudinal drive shaft assembly axis of rotation causes rotation of the blade driveshaft, the worm gear and cutting blade about the cutting blade axis of rotation; the frame body including a first side wall and a second side wall spaced apart by a front wall and a back wall, a through bore extending along a frame body longitudinal axis and a transversely extending recess extending into the first side wall in a direction toward the second side wall and opening into the through bore; a worm screw driveshaft support assembly supporting the worm screw driveshaft for rotation about the longitudinal drive shaft assembly axis of rotation and including a first bearing support engaging at least a portion of the worm screw drive shaft extending between the distal end of the worm screw driveshaft and the worm screw and a second bearing support engaging at least a portion of the worm screw drive shaft extending between the proximal end of the driveshaft and the worm screw; and a blade driveshaft support assembly supporting the blade driveshaft for rotation about the cutting blade axis of rotation.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Overview

Figure 1:
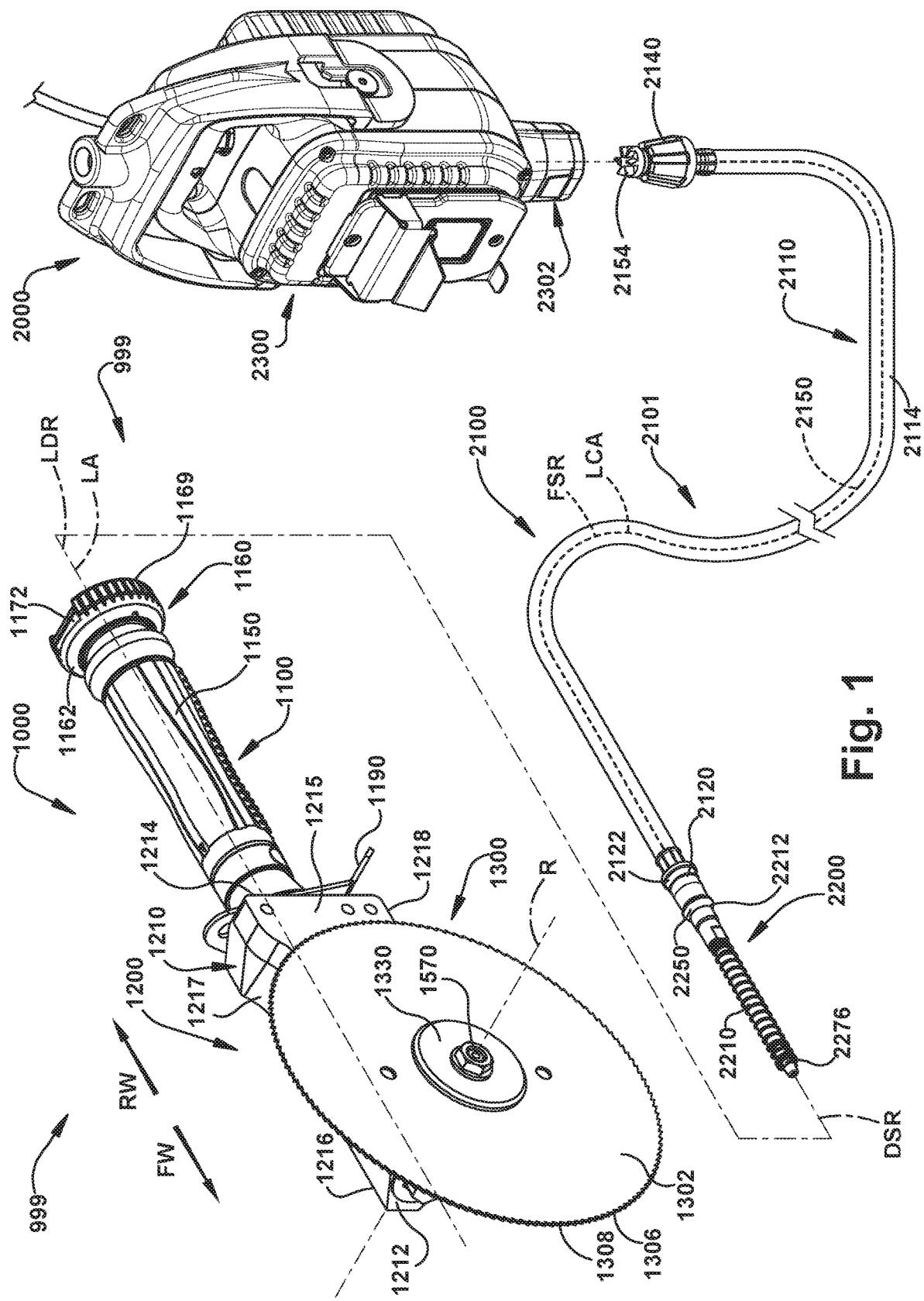
FIG. 1 is a schematic exploded, top, front perspective view of a first exemplary embodiment of a power operated tool assembly of the present disclosure including a power operated scribe saw, a flexible shaft drive transmission and an external motor, the power operated scribe saw including a handle assembly, a head assembly, including a frame body, a cutting blade assembly including a circular cutting blade, a drive mechanism including a drive train including a set of interconnected drive shafts and a worm gear drive arrangement and a driveshaft support assembly.

The present disclosure relates to a power operated tool assembly shown generally at 999 in FIG. 1. In one exemplary embodiment, the power operated tool assembly 999 includes a power operated tool, such as a power operated scribe saw 1000, and an external drive assembly 2000. A first exemplary embodiment of the power operated scribe saw 1000 is shown generally at 1000 in FIGS. 1-12, which include a cutting blade assembly 1300 including a disk-shaped or circular cutting blade 1302. The external drive assembly 2000 provides motive power to rotatably drive the disk-shaped cutting blade 1302 about a cutting blade axis of rotation R. The cutting blade 1302 is generally disk-shaped having an inner periphery 1304 defining a central opening 1310 of the cutting blade 1302 and an outer periphery 1306 defining a cutting edge 1308 of the blade 1302. The power operated scribe saw 1000 includes an elongated handle assembly 1100 and a head assembly 1200 coupled to and projecting from a distal end portion 1106 of the handle assembly 1000. The head assembly 1200 of the power operated scribe saw 1000 includes a frame body 1210 and the cutting blade assembly 1300 including the cutting blade 1302 and an adapter collar 1320 for mounting the cutting blade 1302 to a blade driveshaft 1570. The cutting blade assembly 1300 is coupled to the frame body 1210. The handle assembly 1000 is configured to be grasped by an operator of the power operated scribe saw 1000 and includes a generally cylindrical through bore or throughbore 1102 that extent along and is substantially centered about a longitudinal axis LA of the handle assembly 1100.

As best seen in FIGS. 1-3 and 5-9, the handle assembly 1100 includes a cylindrical handle body 1110 and a handle extension 1120 extending distally or in a forward direction FW from the handle body 1110. The handle body 1110 supports a contoured hand piece 1150 which is grasped by the operated to manipulated the power operated scribe saw 1000. The handle extension 1120 is configured to interface with a rearward interface portion 1230 of the frame body 1210 of the head assembly 1200 to affix the head assembly 1200 to the handle assembly 1100. The handle assembly 1100 also includes a driver retainer assembly 1160 extending proximally or in a rearward direction RW from the handle body 1110. A central portion 1114 of the handle body 1110 is generally cylindrical and receives an overlying contoured hand piece (not shown) that is gripped by the operator to manipulate the power operated scribe saw 1000.

The power operated scribe saw 1000 of the present disclosure additionally includes a novel drive mechanism 1500 operatively coupled between the external drive assembly 2000 of the assembly 999 and the cutting blade assembly 1300 of the head assembly 1200 to drive the cutting blade 1302 about the cutting blade axis of rotation R. The size or diameter of the cutting blade 1302 of the power operated scribe saw 1000 is dependent upon the cutting/trimming task to be performed and, thus, the diameter of the blade 1302 is variable and the head assembly 1200 and drive mechanism 1500 of the power operated scribe saw 1000 are adapted to rotatably support and drive the cutting blade 1302 about the blade axis of rotation R. Ignoring the radial extent of the blade 1302, the power operated scribe saw 1000 extends between a forward or distal end 1002 and a rearward or proximal end 1004.

Figure 2:
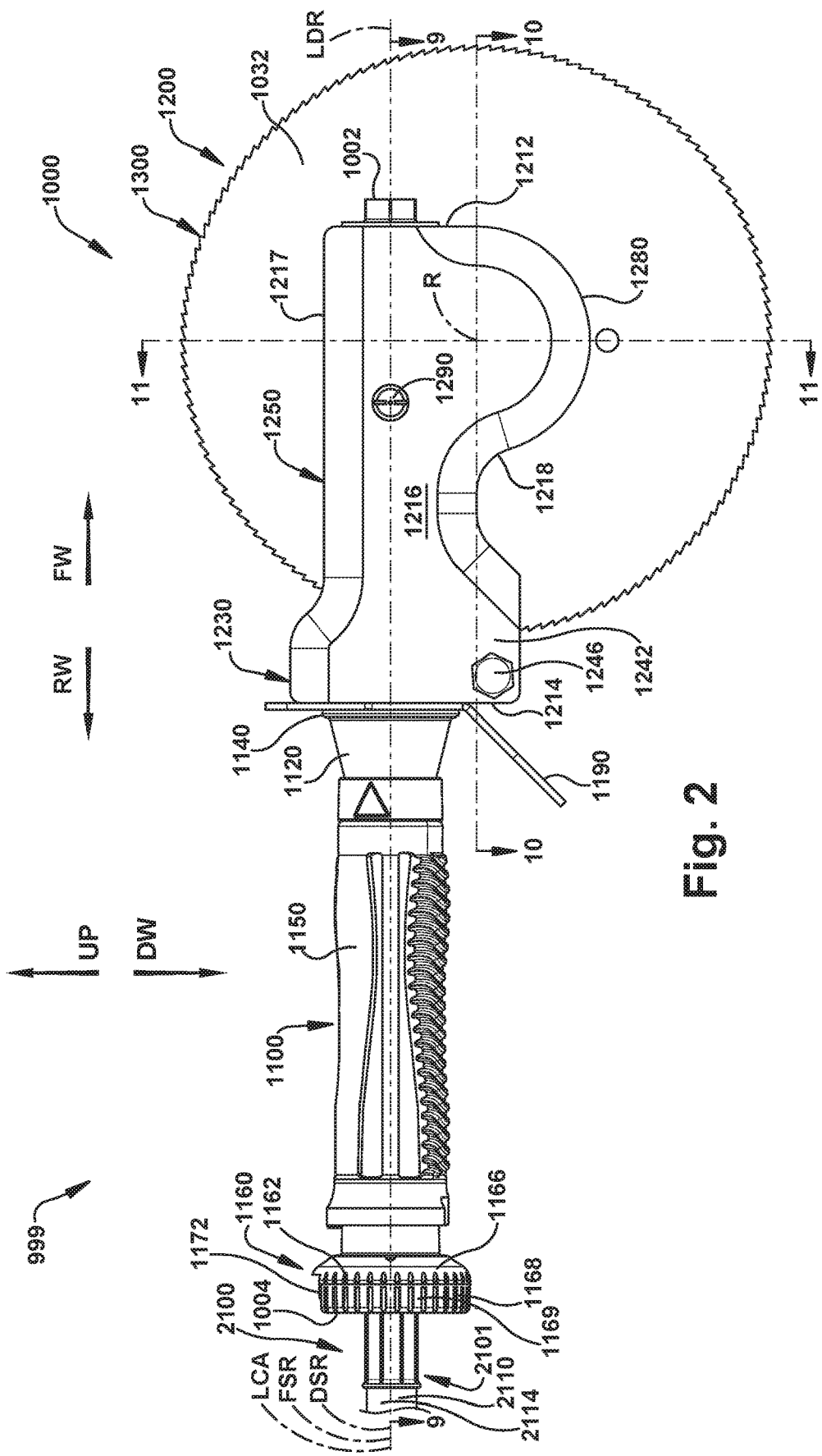
FIG. 2 is a schematic right side elevation view of a portion of the power operated tool assembly of FIG. 1 including the power operated scribe saw and a portion the flexible shaft drive transmission.
Figure 3:
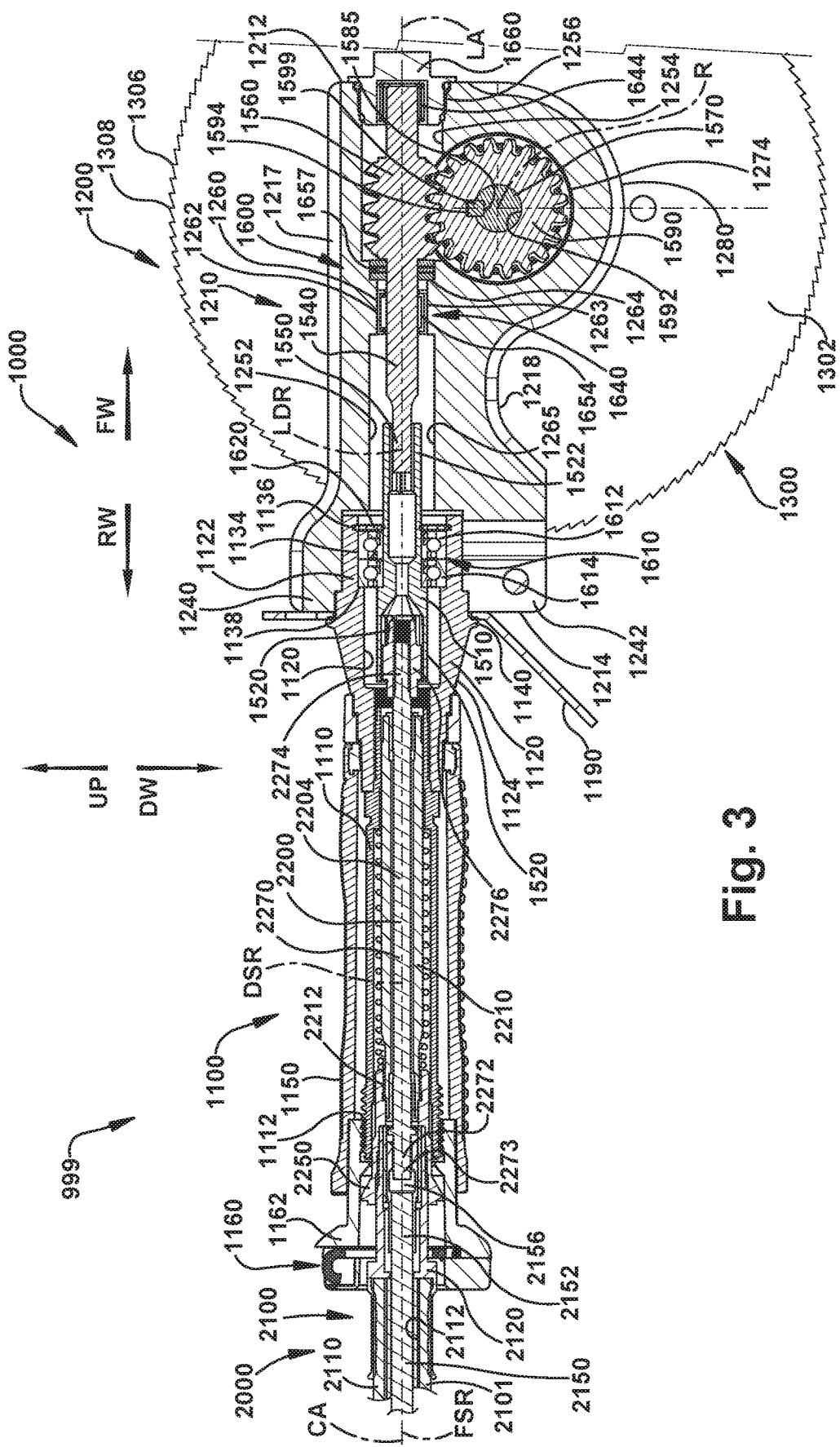
FIG. 3 is a schematic vertical, longitudinal sectional view of the power operated tool assembly of FIG. 2.
Figure 4:
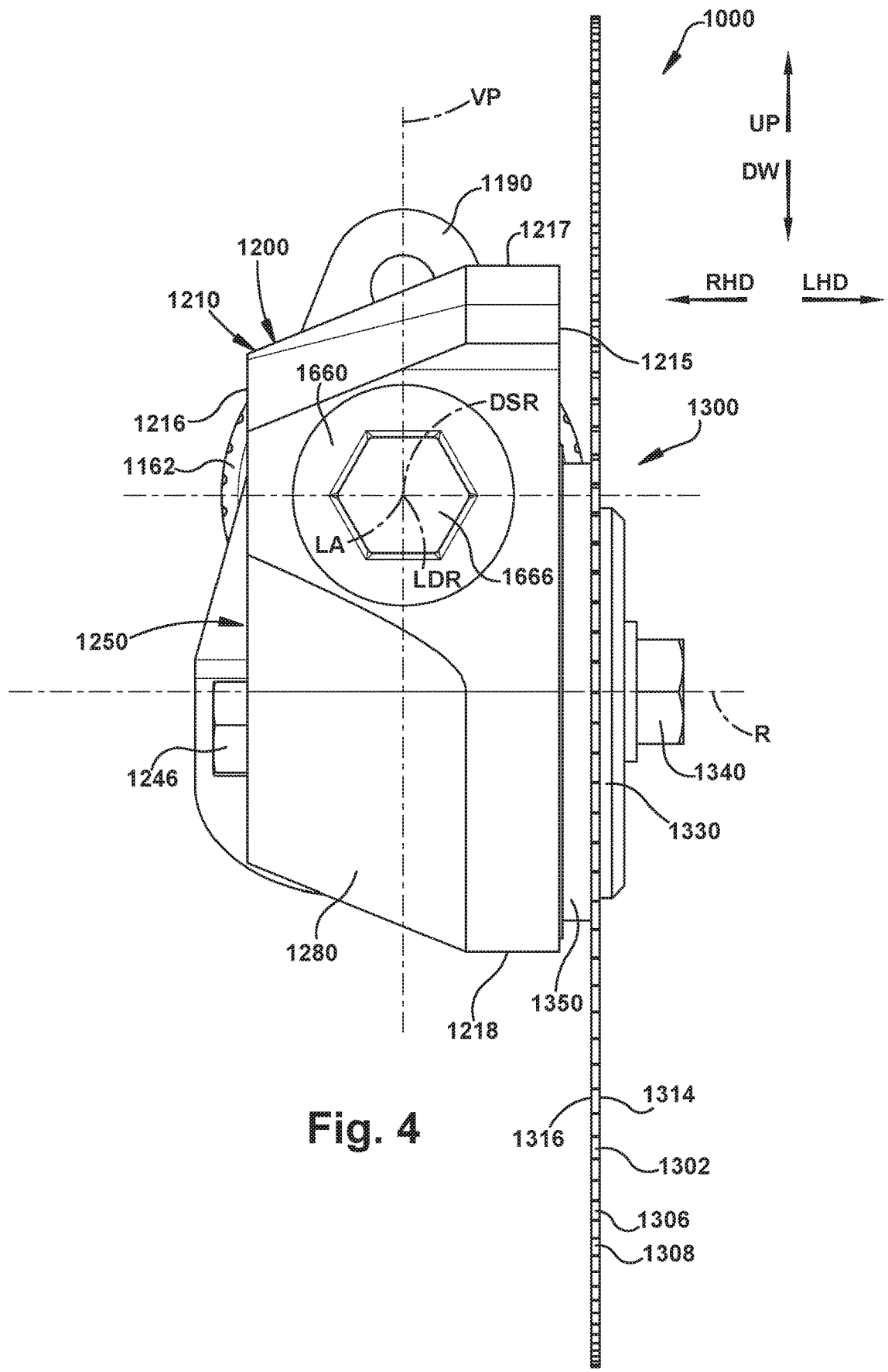
FIG. 4 is a schematic front elevation view of the power operated scribe saw of FIG. 1.
Figure 5:
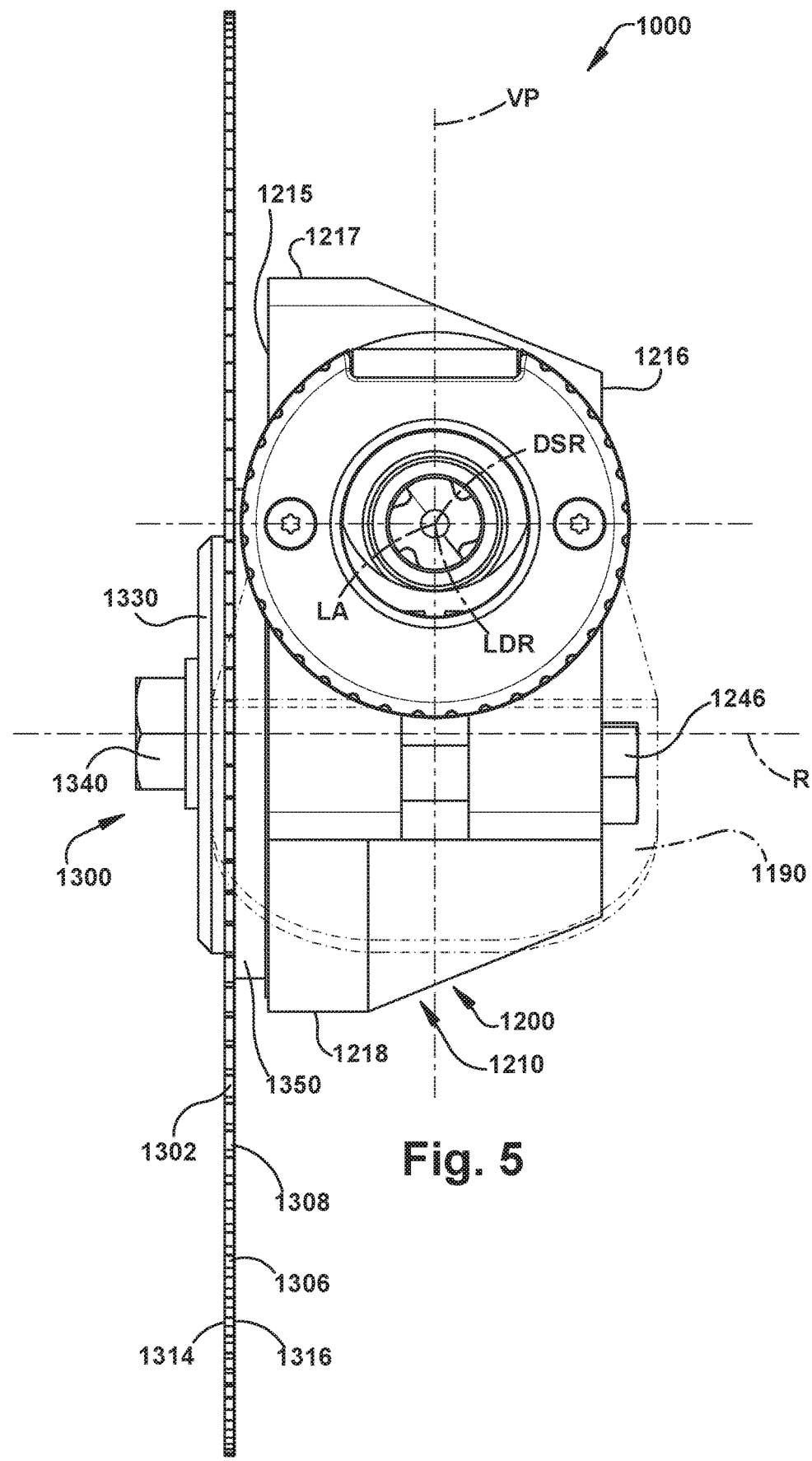
FIG. 5 is a schematic rear elevation view of the power operated scribe saw of FIG. 1.
Figure 6:
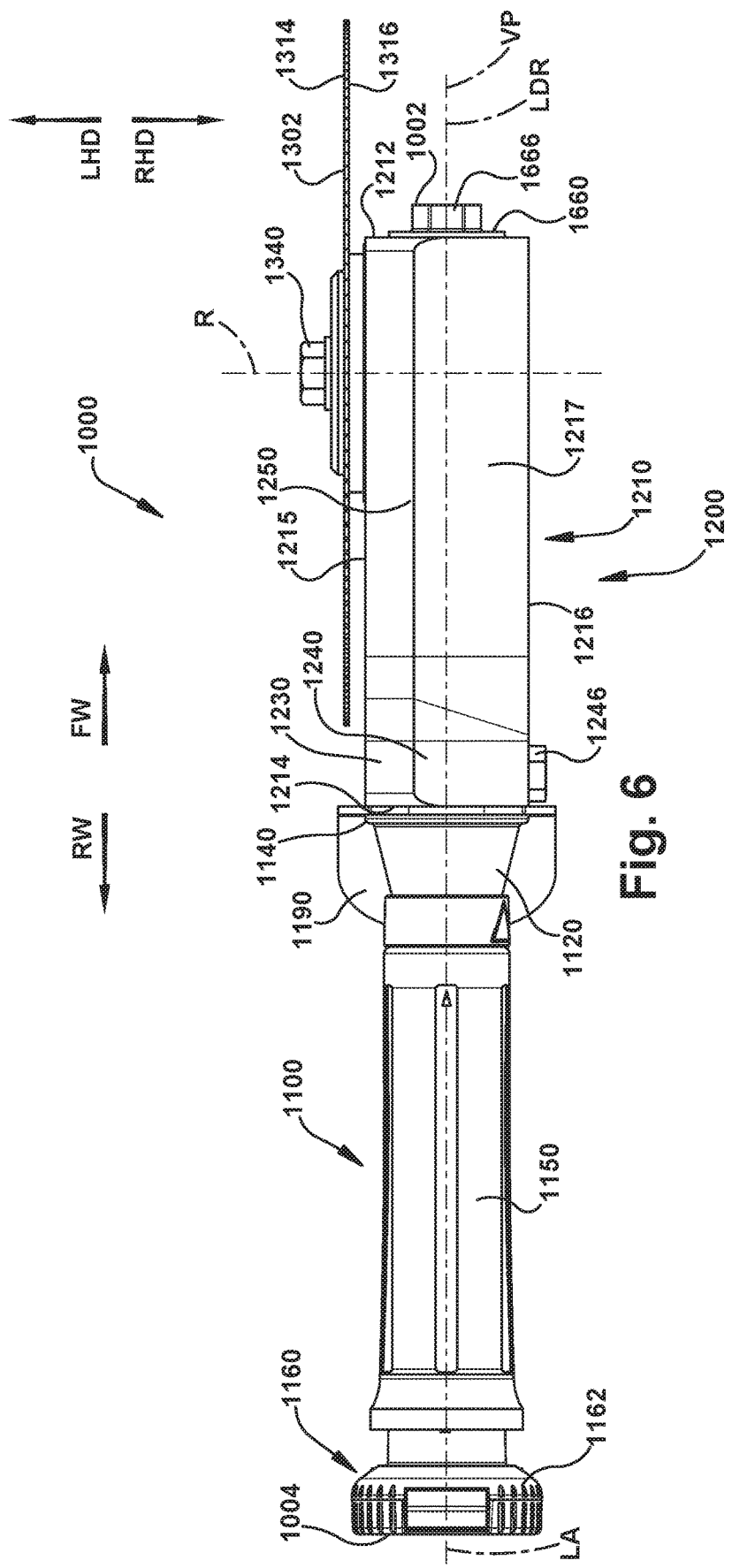
FIG. 6 is a schematic top plan view of the power operated scribe saw of FIG. 1, with the blade retainer assembly in the first blade retaining position.
Figure 7:
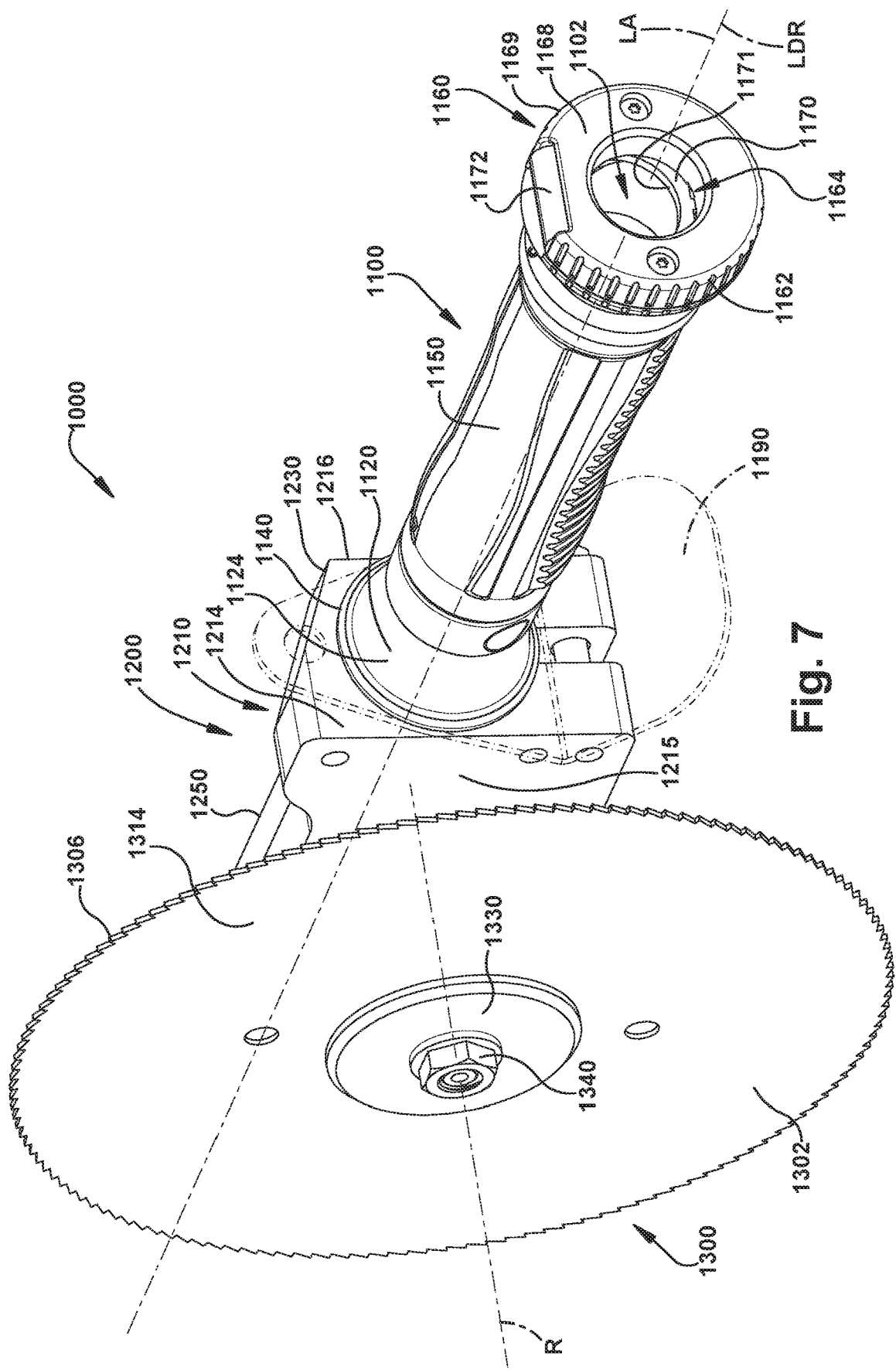
FIG. 7 is a schematic top, rear perspective view of the power operated trimming tool of FIG. 1, with a finger guard of the handle assembly shown in dashed line.
Figure 8:
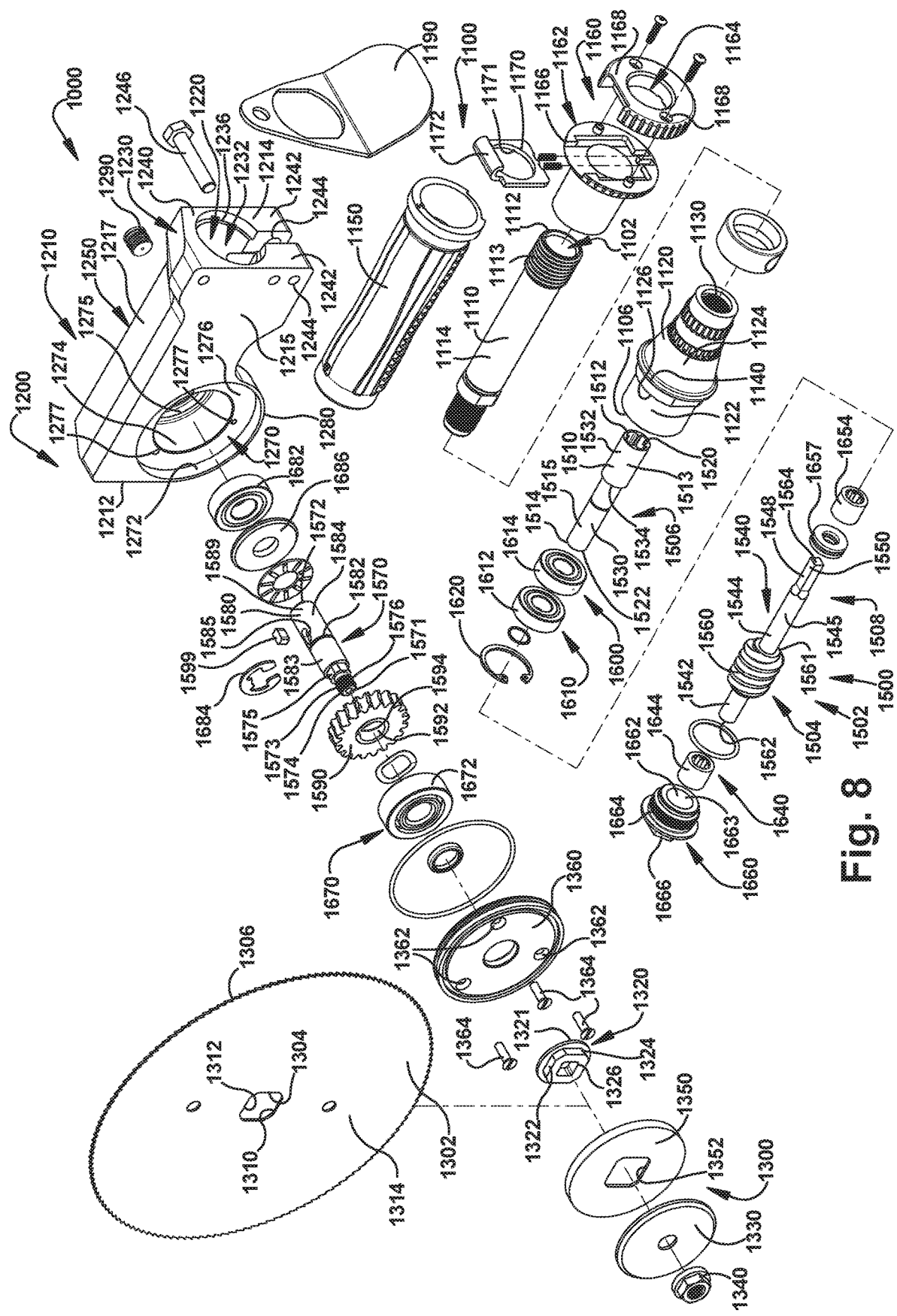
FIG. 8 is a schematic exploded, top, rear perspective view of the power operated scribe saw of FIG. 1.
Figure 9:
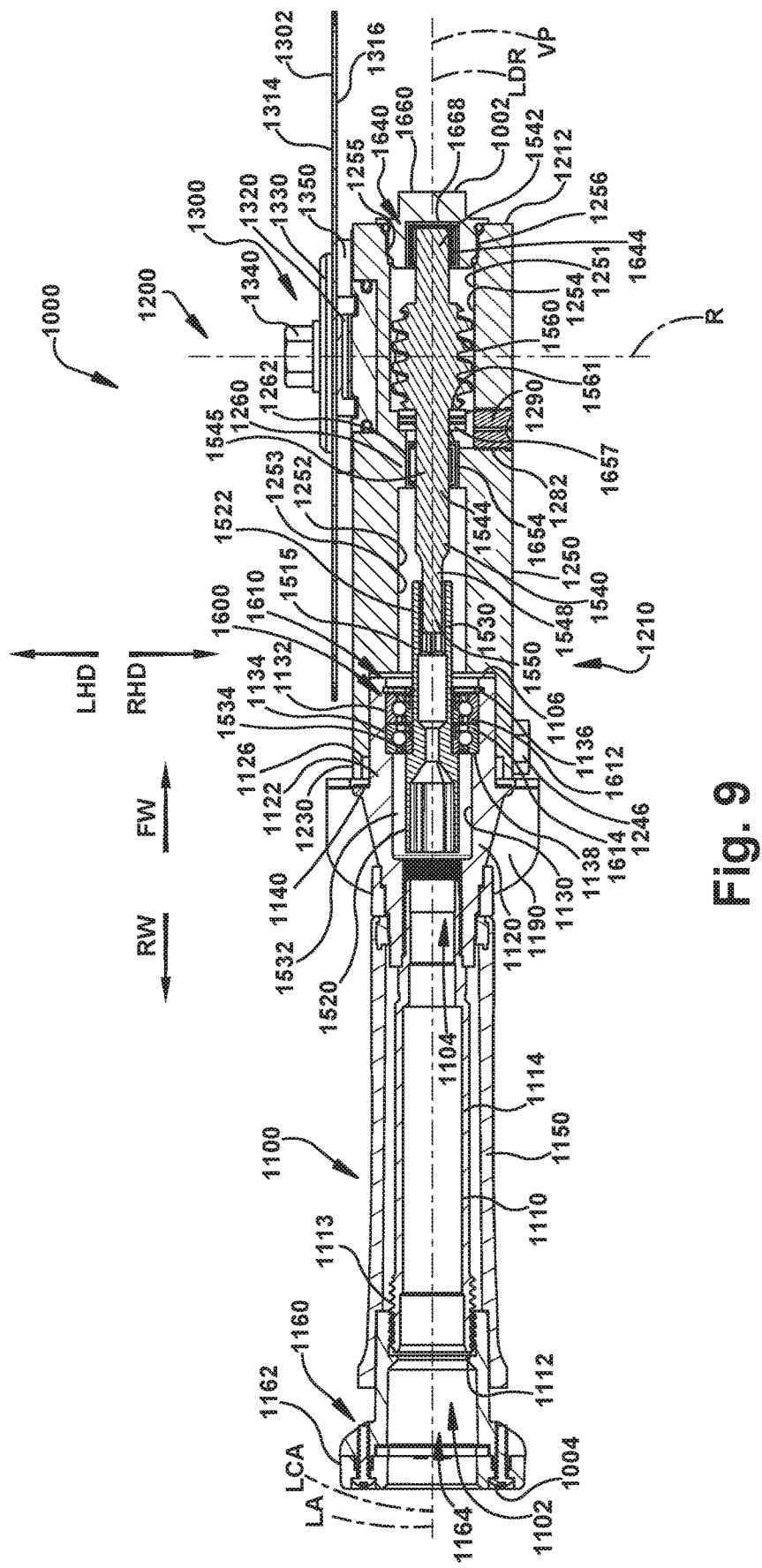
FIG. 9 is a schematic horizontal, longitudinal section view of the power operated scribe saw of FIG. 1, as seen from a plane indicated by the line 9-9 in FIG. 2.
Figure 10:
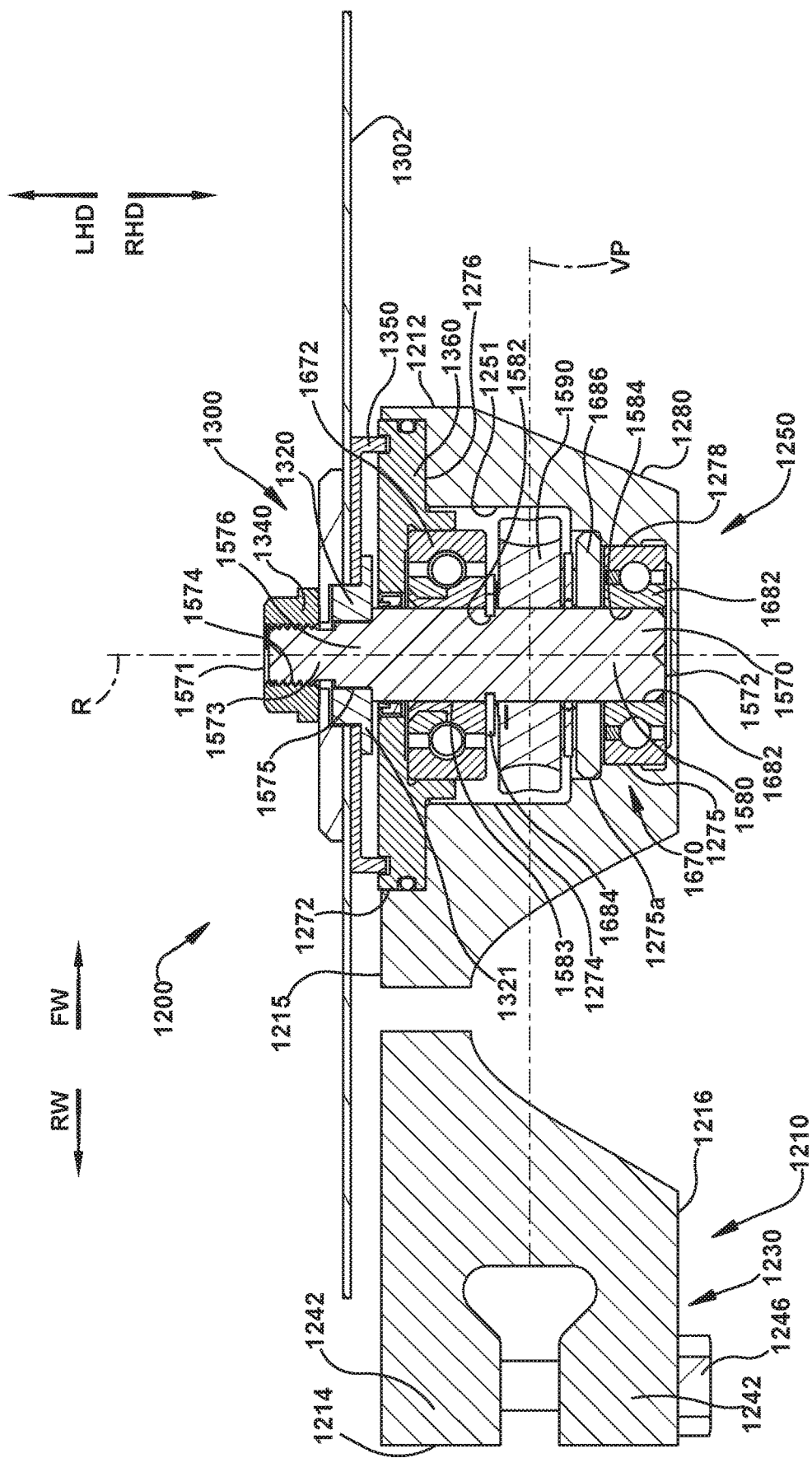
FIG. 10 is a schematic horizontal, longitudinal section view of the head assembly of the power operated scribe saw of FIG. 1, as seen from a plane indicated by the line 10-10 in FIG. 2.
Figure 11:
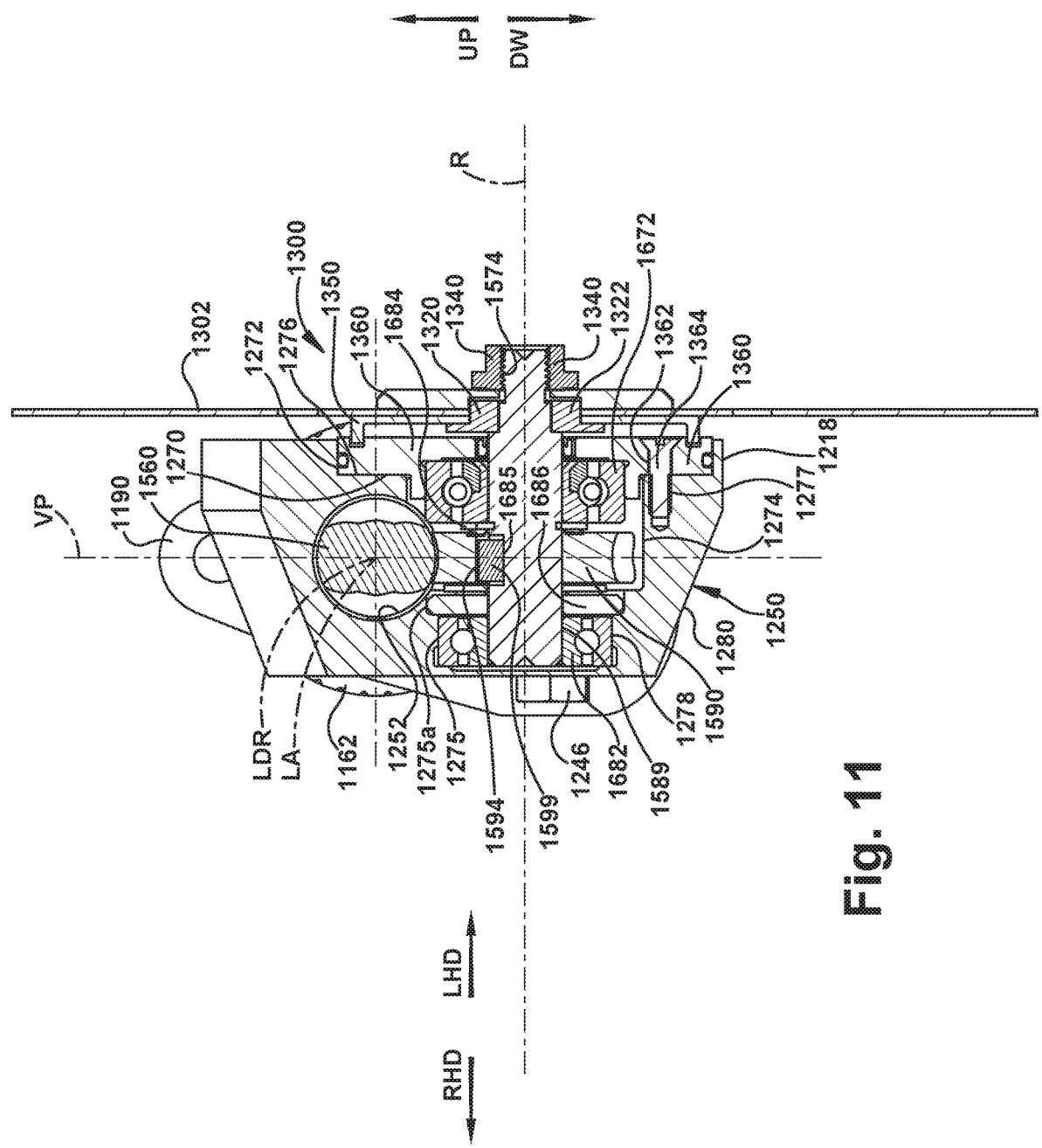
FIG. 11 is a vertical section view of the head assembly of the power operated scribe saw of FIG. 1, as seen from a plane indicated by the line 11-11 in FIG. 2.
Figure 12:
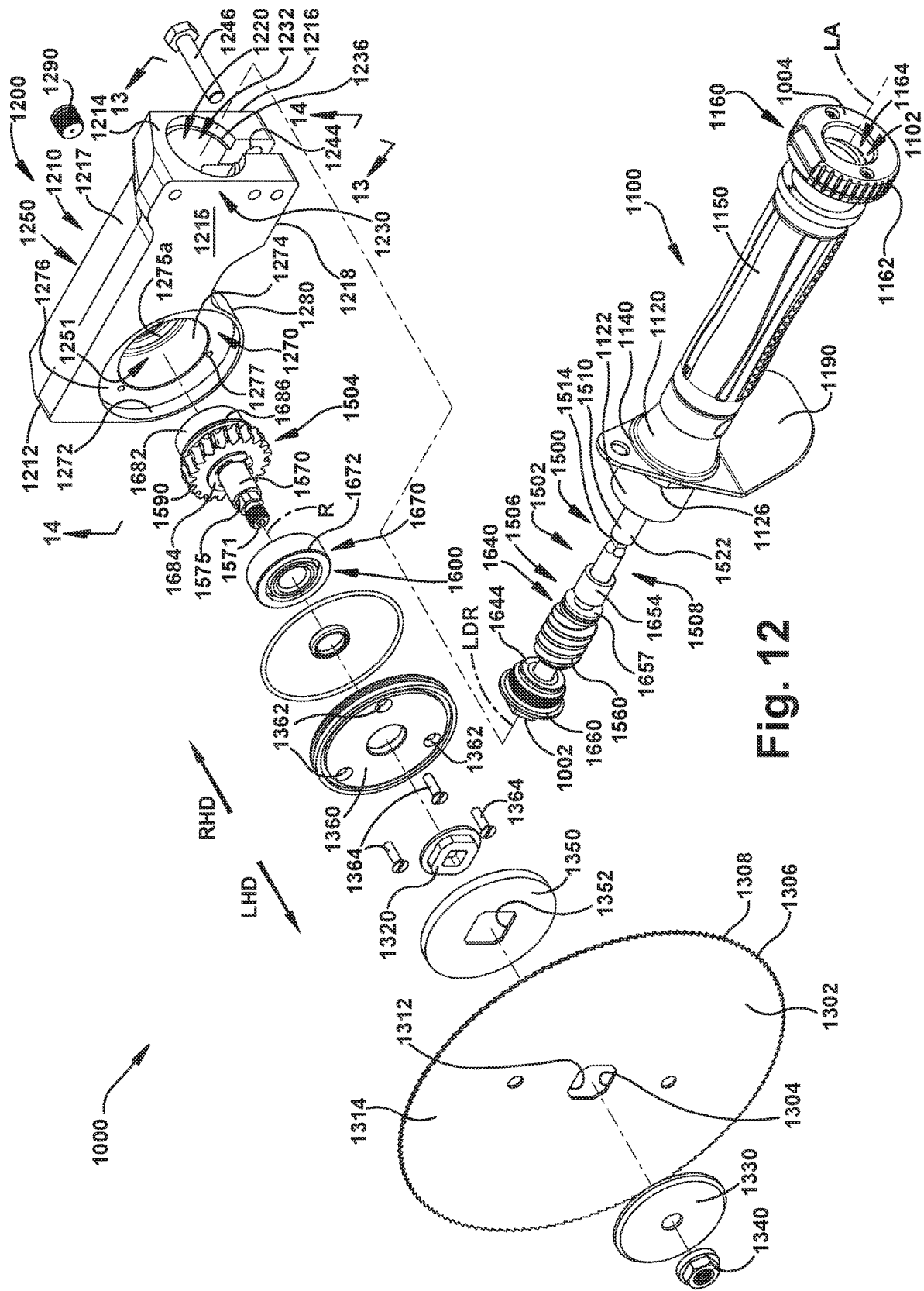
FIG. 12 is another schematic exploded, top, rear perspective view of the power operated scribe saw of FIG. 1, with selected components in assembled condition.
Figure 13:
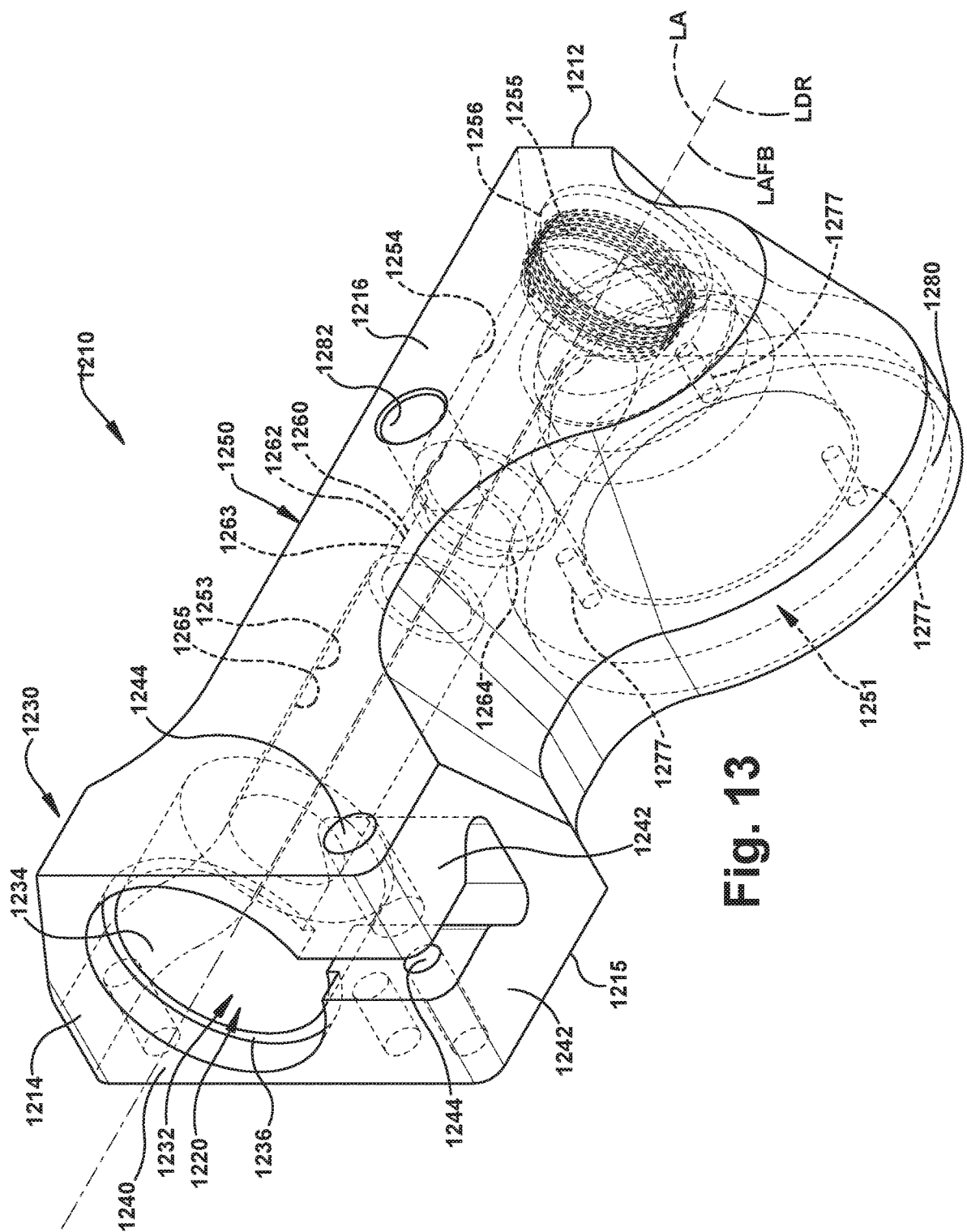
FIG. 13 is a schematic bottom, right side perspective view of the frame body of the head assembly of the power operated scribe saw of FIG. 1.
Figure 14:
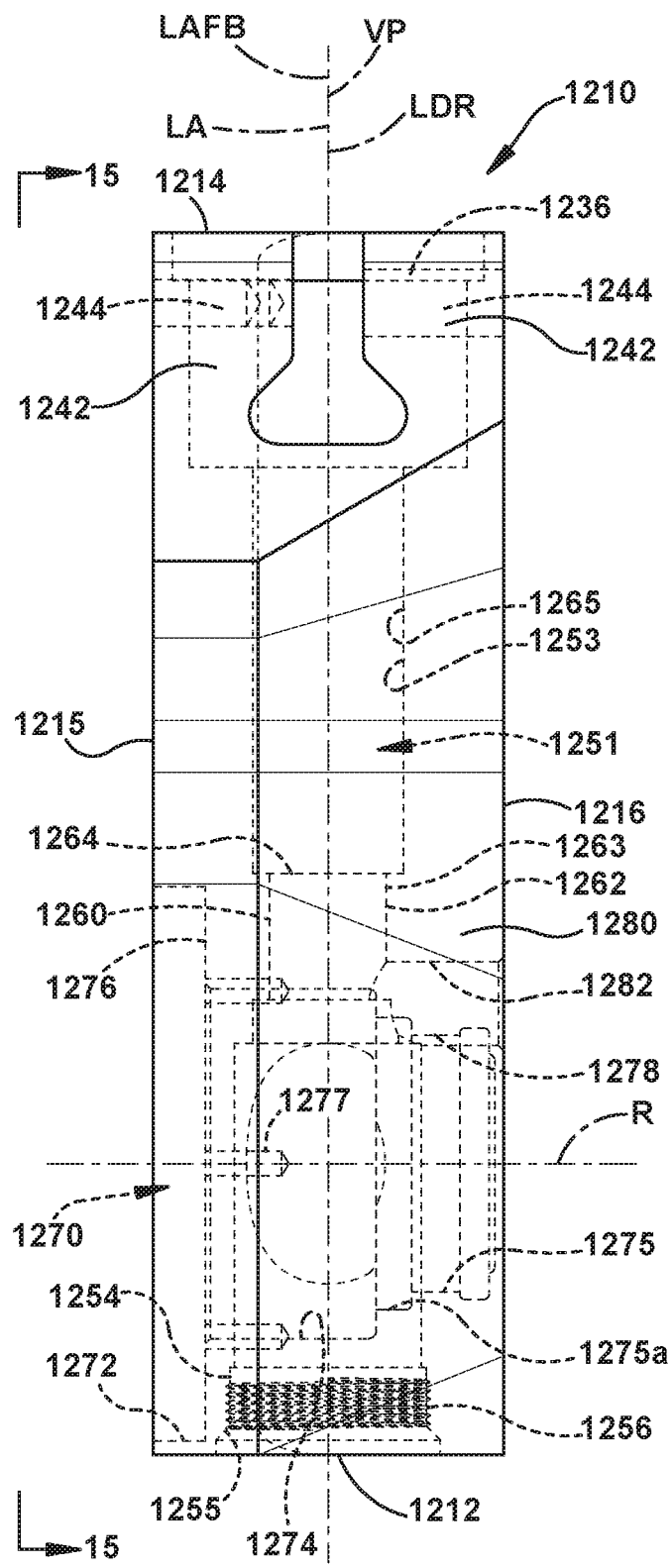
FIG. 14 is a schematic bottom plan view of the frame body of FIG. 13.
Figure 15:
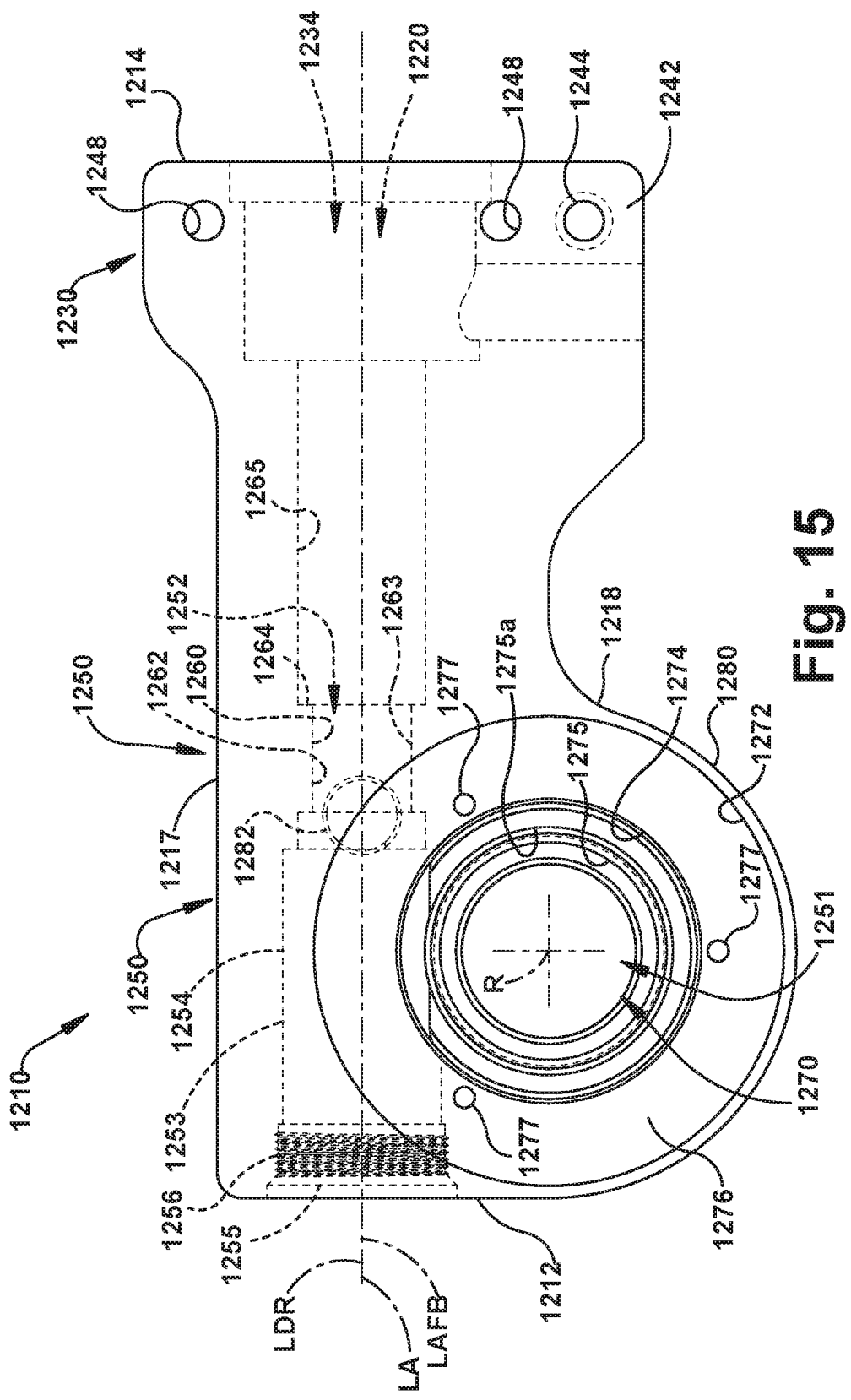
FIG. 15 is a schematic side elevation view of the frame body of FIG. 13.

As best seen in FIGS. 1-3, the external drive assembly 2000, in one exemplary embodiment, includes an external motor 2300 and a shaft drive transmission assembly 2100. The shaft drive transmission assembly 2100 includes a flexible shaft drive transmission 2101 and a driver assembly 2200 coupled to the handle assembly 1100 of the power operated scribe saw 1000 and received in the through bore 1102 of the handle assembly. The flexible shaft drive transmission 2101 includes a drive or flex shaft 2150 supported for rotation within a longitudinally extending through bore 2112 of by an outer casing assembly 2110, while the driver assembly 2200 includes a driver shaft 2270 supported for rotation by a tube assembly 2210. The flex shaft 2150 rotates about a flex shaft axis of rotation FSR, while the driver shaft 2270 rotates about a driver shaft axis of rotation DSR. In an interface or coupling region between a distal end 2152 of the flex shaft 2150 and a proximal end 2272 of the driver shaft 2270, the axes of rotation FSR, DSR of the flex shaft 2150 and the driver shaft 2270 are aligned and are coaxial or coincident.

As noted above, the power operated scribe saw 1000 of the present disclosure includes the drive mechanism 1500 which is operatively coupled between the cutting blade 1302 and the driver assembly 2200 of the shaft drive transmission assembly 2100. As best seen in FIGS. 3 and 8-12, the drive mechanism 1500 includes a drive train 1502 supported for rotation by a driveshaft support assembly 1600 of the drive mechanism 1500 of the power operated scribe saw 1000. In one exemplary embodiment of the power operated scribe saw 1000 of the present disclosure, the drive train 1502 comprises a worm gear drive arrangement 1504, for rotatably driving the cutting blade 1302, mounted on an interconnected set of drive shafts 1506 operatively coupled between the driver shaft 2270 of the driver assembly 2200 and the cutting blade 1302. In one exemplary embodiment, the set of drive shafts 1506 of the drive mechanism includes a longitudinally extending drive shaft assembly 1508 and a blade driveshaft 1570 coupled between the longitudinally extending drive shaft assembly 1508 and the cutting blade 1302. The cutting blade 1302 is mounted to blade driveshaft 1570. Advantageously, the longitudinally extending drive shaft assembly 1508 rotates about a longitudinal drive shaft assembly axis of rotation LDR that is aligned and coaxial with the driver shaft axis of rotation DSR, while the blade driveshaft 1570 rotates about and defines the cutting blade axis of rotation R which is orthogonal to and vertically offset from the longitudinal drive shaft assembly axis of rotation LDR.

The longitudinally extending drive shaft assembly 1508, in one exemplary embodiment, includes a pair of aligned drive shafts, namely, an adapter driveshaft 1510 and a worm screw driveshaft or worm driveshaft 1540. A drive fitting at 2276 at the distal end 2274 of the driver shaft 2270 of the driver assembly 2200 engages a driven fitting 1520 at a proximal end 1512 of the adapter driveshaft 1510 such that as the driver shaft 2200 rotates about the driver shaft axis of rotation DSR, the longitudinally extending drive shaft assembly 1508 rotates about its longitudinal drive shaft assembly axis of rotation LDR. A distal end 1514 of the adapter driveshaft 1510 includes a drive fitting 1522 which engages a driven fitting 1550 at a proximal end 1564 of the worm driveshaft 1540 such that the adapter and worm driveshafts 1510, 1540 rotate in unison about the longitudinal drive shaft assembly axis of rotation LDR. In one exemplary embodiment, the driveshaft support assembly 1600 includes three bearing support assemblies: a) an adapter driveshaft support assembly 1610 supporting the adapter driveshaft 1510 for rotation about the longitudinal drive shaft assembly axis of rotation LDR; b) a worm driveshaft support assembly 1640 for supporting the worm driveshaft 1540 about the longitudinal drive shaft assembly axis of rotation LDR; and c) a blade driveshaft support assembly 1670 for supporting the blade driveshaft 570 about the blade axis of rotation R.

In one exemplary embodiment, the worm gear drive arrangement 1504 includes a worm or worm screw 1560 mounted to the worm driveshaft 1540 which operatively engages a worm gear or worm wheel 1590 mounted to the blade driveshaft 1570. The cutting blade 1302 is also mounted to the blade driveshaft 1570. In one exemplary embodiment, the cutting blade 1302 is mounted to the blade driveshaft 1570 such that: a) rotation of the driver shaft 2270 of the driver assembly 2200 about the driver shaft axis of rotation DSR causes the longitudinally extending drive shaft assembly 1508 (including the adapter driveshaft 1510 and the worm driveshaft 1540) to rotate about the longitudinal drive shaft assembly axis of rotation LDR which is aligned and coaxial or coincident with the driver shaft axis of rotation DSR; b) rotation of the worm driveshaft 1540 and the worm screw 1560 mounted thereto about the longitudinal drive shaft assembly axis of rotation LDR causes the interconnected worm gear 1590 and the blade driveshaft 1570 to which the worm gear 1590 to rotate about the blade axis of rotation R; and c) rotation of the blade driveshaft 1570 about the blade axis of rotation R cause the cutting blade assembly 1300, including the cutting blade 1302, mounted to the blade driveshaft 1570 to rotate about the blade axis of rotation R.

The gear train 1502 of the present disclosure is advantageously compact owing to the worm gear drive arrangement 1504 and the interconnected set of drive shafts 1506 which are supported for rotation by a drive shaft support assembly 1600. Additionally, a proximal portion 1513 of the adapter driveshaft 1510 is disposed within the handle extension 1120 of the handle assembly 1100 and the adapter driveshaft 1510 is supported for rotation by an adapter driveshaft support assembly 1610 of the drive shaft support assembly 1600 that is disposed within a forward portion 1104 of the handle assembly through bore 1102. Thus, the longitudinal extent or longitudinal projection of the head assembly frame body 1210 in the distal or forward direction FW (that is, along the handle assembly longitudinal axis LA) is minimized by configuration of the drive mechanism 1500 including the worm gear drive arrangement 1504, the set of interconnected drive shafts 1506, and the gear train support assembly 1600. Advantageously, the driveshafts 1510, 1540, 1570 of the set of drive shafts 1506 is individually supported by one of three driveshaft support assemblies 1610, 1640, 1670. Each of the three driveshaft support assemblies 1610, 1640, 1670 includes a pair of spaced, radial bearing members. This multiple radial bearing support configuration of the drive shaft support assembly 1600 of the present disclosure advantageously mitigates excessive vibration that would otherwise result from one or more drive shafts having a cantilevered bearing support for one or more of the drive shafts. Of the three driveshafts, the worm driveshaft 1540 has the greatest longitudinal extent or length, as compared to the shorter adapter driveshaft 1510 and the blade driveshaft 1570 and, thus, the worm driveshaft 1540 would be most prone to undesirable vibration. Thus, the utilization of the multiple radial, non-cantilevered, bearing support members for the worm driveshaft support assembly 1640 advantageously allows for worm driveshaft 1540 to be of a relatively smaller diameter than would otherwise be the case, thereby reducing space requirements within a support portion 1250 of the frame body 1210 and reducing the fabrication cost of the work driveshaft component. Similarly, utilization of multiple radial, non-cantilevered, bearing support members for the adapter and blade driveshaft support assemblies 1610, 1670 advantageously allows for the adapter and worm driveshafts 1510, 1540 to be of a relatively smaller diameter than would otherwise be the case. Additionally and advantageously, the drive mechanism 1600 of the power operated scribe saw 1000 may be configured to provide an optimal rotational speed for the cutting blade 1302 such that a desired angular velocity or revolutions per minute may be achieved given the characteristics of the workpiece to be cut or trimmed.

As used herein and as seen in FIG. 2, the forward direction FW is a direction along or parallel to the handle assembly longitudinal axis LA toward the distal end 1002 of the power operated scribe saw 1000, while the rearward direction RW is opposite the forward direction FW. The vertical upward direction UP is orthogonal to the handle assembly longitudinal axis LA in a direction toward an upper wall 1217 of the frame body 1210, while the vertical downward direction DW is opposite the upward direction UP. As used herein and seen in FIG. 5, the horizontal direction is orthogonal to the handle assembly longitudinal axis LA and the vertical upward and downward directions UP, DW, the left horizontal direction LHD is orthogonal to the handle assembly longitudinal axis LA in a direction toward a first side wall 1216 of the frame body 1210 from the longitudinal axis LA (as viewed from the perspective of an operator gripping the handle assembly), while the right horizontal direction RHD is opposite the left horizontal direction LHD. The terms longitudinally shall mean in a direction along or parallel to the handle assembly longitudinal axis LA.

External Drive Assembly 2000

As seen in FIGS. 1-3, the external motor 2300 is operatively coupled to the drive mechanism 1500 via the shaft drive transmission assembly 2100 including the flexible shaft drive transmission 2101 and the driver assembly 2200. In one exemplary embodiment, the flexible shaft drive transmission 2101 includes the outer casing assembly 2110 and the flexible drive shaft or flex shaft 2150 which is rotatably supported within a flexible, tubular outer casing 2114 of the outer casing assembly 2110. The flex shaft 2150 defines a central longitudinal axis LCA (shown schematically in FIG. 1) of the shaft drive transmission 1700 and the flex shaft 2150 rotates about the flex shaft axis of rotation FSR which is aligned with and coaxial with the central longitudinal axis LCA of the flexible shaft drive transmission 2110. The outer casing assembly 2110 includes a motor end coupling 2140 at a proximal end of the casing 2114 and a driver assembly coupling 2120 at a distal end of the casing 2114. The driver assembly coupling 2120 engages a mating drive transmission coupling 2250 at a proximal end 2212 of the tube assembly 2210 of the driver assembly 2200. The driver assembly 2200 extends into the through bore 1102 of the handle assembly 1100 and is releasably coupled to the handle assembly 1100 by the driver retainer assembly 1160. The flex shaft 1730 includes a driven fitting 2154 at a proximal end of the flex shaft 2150 and a drive fitting 2156 at a distal end 2152 of the flex shaft 2150. When the motor end coupling 2140 is releasably coupled to a motor coupling 2302 of the motor 2300, the driven fitting 2154 of the flex shaft 2150 engages and is rotated by the mating motor fitting (not shown) affixed to the output drive shaft of the motor 2300. This results in rotation of the flex shaft 2150 about the flex shaft axis of rotation FSR and the central longitudinal axis LCA of the flexible shaft drive transmission 2110.

The drive fitting 2156 at the distal end 2152 of the flex shaft 2150 interfits with and rotatably drives a driven fitting 2273 at the proximal end 2272 of the driver shaft 2270 of the driver assembly 2200 and thereby rotates the driver shaft 2270 about its driver shaft axis of rotation DSR. As noted above, in the region of the proximal end 2272 of the driver shaft 2270, the axes of rotation FSR, DSR of the flex shaft 2150 and the driver shaft 2270 are aligned and coaxial. Additionally, as noted above, the drive fitting 2276 at the distal end portion 2274 of the driver shaft 2270 engages and interfits with the driven fitting 1520 at the proximal end 1512 of the adapter driveshaft 1510 of the longitudinally extending driveshaft assembly 1508 to rotate the driveshaft assembly 1508 about its drive shaft assembly axis of rotation LDR. As previously noted, advantageously, the drive shaft assembly axis of rotation LDR of the longitudinally drive shaft assembly 1508 of the drive train 1502 is substantially aligned and coaxial/coincident with the driver shaft axis of rotation DSR as well as the longitudinal axis LA of the handle assembly 1100.

As best seen in FIGS. 2 and 3, when the driver assembly coupling 2120 of the outer casing assembly 2110 is coupled to the handle assembly 1100 via the driver retainer assembly 1160 of the handle assembly 1100 the driver assembly 2200 is received in the through bore 1102 of the handle assembly 1100. The drive fitting 2276 at the distal end portion 2274 of the driver shaft 2270 engages and interfits with the driven fitting 1520 at the proximal end 1512 of the adapter driveshaft 1510 of the longitudinally extending driveshaft assembly 1508 to drive the drive train 1502 of the drive mechanism 1500 and rotate the cutting blade 1302 about its axis of rotation R. Specifically, the rotation of the driver shaft 2270 rotate the driveshaft assembly 1508 about its drive shaft assembly axis of rotation LDR and rotates the blade driveshaft about the blade axis of rotation R thereby cause rotation of the blade about the same axis of rotation R via the worm gear drive arrangement 1504. Specifically, rotation of the worm driveshaft 1540 (and thereby the worm 1560 affixed to the worm driveshaft 1540) about the longitudinal drive shaft assembly axis of rotation LDR causes the worm 1560 of the worm gear drive arrangement 1504 to helically drive the worm gear 1590 affixed to the blade driveshaft 1590 about the cutting blade axis of rotation R. Since both the cutting blade 1302 and the worm gear 1590 are affixed to the blade driveshaft 1540, when the worm 1560 helically drives the worm gear 1590, the cutting blade 1302, blade driveshaft 1570 and worm gear 1590 all rotate about the cutting blade axis of rotation R.

Handle Assembly 1100

In one exemplary embodiment and as best seen in FIGS. 1-3 and 5-9, the handle assembly 1100 includes the handle body 1110, the hand piece 1150, the handle extension 1120 and the driver retainer assembly 1160. The handle body 1110 includes a threaded end portion 1113 formed on reduced diameter proximal end portion 1112 of the handle body 1110. The cylindrical central portion 1114 of the handle body 1110 is configured to receive the hand piece 1150 which is grasped by the hand of the operator to manipulate the power operated scribe saw 1000 for cutting and trimming operations on a workpiece.

The handle extension 1120 extends distally from the handle body and includes a reduced diameter distal end portion 1122. The reduced diameter end portion 1122 is sized to be snugly received in the interface portion 1230 of the frame body 1210 and, more specifically, to be snugly received in a through bore 1232 defined by the interface portion 1230. In one exemplary embodiment, a finger guard 1190 is positioned between a radially extending shoulder 1140 of the handle extension 1120 and the back or proximal end wall 1214 of the frame body 1210 for protection of the operator's hand. The radially extending shoulder 1140 is just rearward of the reduced diameter distal end portion 1122 of the handle extension 1120. An inner surface 1130 of the handle extension 1120 defines a forward portion 1104 of the handle assembly through bore 1102. A distal section 1132 of the inner surface 1130 of the handle extension 1120 defines a cylindrical bearing seating region 1134 which receives and supports the adapter shaft support assembly 1610. In one exemplary embodiment, the adapter driveshaft support assembly 1610 includes a first distal bearing support assembly 1612 and a second proximal bearing support assembly 1614. The first and second bearing support assemblies 1612, 1614 are received in the bearing seating region 1134 of the handle extension 1120. As can best be seen in FIG. 3, the inner surface 1130 of the handle extension 1120 also includes an annular groove 1136 adjacent the bearing seating region 1134 that receives a retainer ring 1620 of the adapter driveshaft support assembly 1610 to maintain the first and second bearing support assemblies 1682, 1684 in place. The first and second bearing support assemblies 1612, 1614 of the adapter driveshaft support assembly 1610 are constrained from axial or longitudinal movement in the rearward direction RW within the handle assembly through bore 1102 by a radially extending shoulder 1138 of the handle extension inner surface 1130 and constrained from axial or longitudinal movement in the forward direction FW by the retainer ring 1620. While, in one exemplary embodiment, the first and second bearing support assemblies 1612, 1614 are adjacent, because the respective bearing surfaces of each assembly are necessarily spaced apart longitudinally, it is still appropriate to say that the first and second bearing support assemblies 1612, 1614 are spaced or are spaced apart along a longitudinal extent of the adapter driveshaft 1510.

The handle assembly 1100 includes the driver retainer assembly 1160 which releasably secures the driver assembly 2200 of the shaft drive transmission assembly 2100 of the external drive assembly 2000 within the through bore 1102 of the handle assembly 1100. The driver retainer assembly 1160 extends from a proximal end portion 1112 of the handle body 1110 and includes a knob 1162 defining a through bore or throughbore 1164. The knob through bore 1164 is aligned with and part of the throughbore 1102 of the handle assembly 1100. The knob 1162 slidingly supports a latch 1170. The latch 1170 includes a central opening 1171 of the latch 1170 and is biased by a pair of springs to slide or move the latch 1170 to a locked position. The central opening 1171 of the latch 1170 is aligned with the through bore 1164 of the knob 1162 and allows passage of the driver assembly 2200 of the shaft drive transmission assembly 2100 into the handle assembly through bore 1102. In the locked position, the central opening 1171 of the latch 1170 is slightly misaligned with the through bore 1164 of the knob 1162 thereby causing a portion of a peripheral surface of the latch 1170 defining the latch opening 1171 to bear against an outer shoulder 2122 of the driver assembly coupling 2120 of the outer casing assembly 2110 of the flexible shaft drive transmission 2101 to releasably secure the driver assembly 2200 within the through bore 1102 of the handle assembly 1100. A radially extending outer surface of the latch 1170 defines an exposed actuation surface 1172 that is accessible in via a slot in an outer surface 1169 of the knob 1162. When the operator pushes on the actuation surface 1172 of the latch 1170, the latch opening 1171 is aligned with the knob through bore 1164 and the driver assembly 2200 may be completely removed from the handle assembly 1100 by moving the driver assembly coupling 2120 and the driver assembly 2200 in the rearward or proximal direction RW.

Frame Body 1210

As best seen in FIGS. 3-4, 6-11 and 13-15, the frame body 1210, when viewed in top plan view, is generally rectangular and includes four generally planar walls including the front or distal end wall 1212, the longitudinally spaced apart back or proximal end wall 1214, and spaced apart first and second side walls 1215, 1216. The frame body 1210 also includes a top wall 1217 and a spaced apart bottom wall 1218. The frame body 1210 extends along and is bisected by a longitudinally extending vertical plane VP. The vertical plane VP is parallel to and intersects and extends along the handle assembly longitudinal axis LA and a longitudinal axis LAFB of the frame body 1210. Extending along the vertical plane VP of the frame body 1210 and the frame body longitudinal axis LAFB is a longitudinally extending through bore 1220 that extends from and through the front and back end walls 1212, 1214. The frame body through bore 1220 extends along the central longitudinal axis LAFB of the frame body 1210, which is aligned and coaxial with/extends along: a) the handle assembly longitudinal axis LA, b) the longitudinal drive shaft axis assembly axis of rotation LDR; and c) the vertical plane VP of the frame body 1210. As noted previously, the frame body 1210 includes the rearward interface portion 1230, which interfits with the distal end portion 1122 of the handle extension 1120 to couple the handle assembly 1100 with the head assembly 1200, and the forwardly extending support portion 1250. The forwardly extending support portion 1250 supports the blade assembly 1300 and includes an interior region 1251 which receives and supports the worm driveshaft 1540, the blade driveshaft 1570, the worm gear drive arrangement 1504 and worm driveshaft support assembly 1240 and the blade driveshaft support assembly 1670.

In one exemplary embodiment, the interface portion 1230 of the frame body 1210 includes the interface portion through bore 1232, which is part of the frame body through bore 1220. An inner surface 1234 of the interface portion 1230 defining the through bore 1232 includes a radially inwardly extending step or shoulder 1236 which provides a stop for engaging a corresponding shoulder 1126 formed on the outer surface 1124 the handle extension 1120 to limit the extent of engagement of the handle extension 1120 into the frame body interface portion 1230 in the forward direction FW. The interface portion 1230 of the frame body 1210 includes a split collar 1240 surrounding the interface portion through bore 1232. A pair of radially outwardly extending spaced apart flanges 1242 extend from the split collar 1240 on opposite sides of a split of the collar 1240. Aligned apertures 1244 formed in the pair of flanges 1242 receive a bolt 1246. As the bolt 1244 is tightened, the flanges 1242 are urged toward each other thereby causing the split collar 1240 to snugly engage the outer surface 1124 of the handle extension 1120 and thereby secure the head assembly 1200 to the handle assembly 1100.

The support portion 1250 of the frame body 1210 includes the interior region 1251. The interior region 1251 is defined by a support portion through bore 1252, which is part of the longitudinally extending frame body through bore 1220, and a transversely extending recess 1270, which extends into the left side wall 1215 of the frame body 1210. The transversely extending recess 1270 is in fluid communication with the support portion through bore 1220 and is formed in a downwardly extending lobe 1280 of the frame body 1210. Stated another way, the transversely extending recess 1270 opens into the support portion through bore 1220 and thus an interior region defined by the transversely extending recess 1270 is connected to or contiguous with the interior region defined by the support portion through bore 1220 and both are part of the support portion interior region 1251. The transversely extending recess 1270 defines stepped cylindrical interior region of the frame body 1210 extending laterally transversely into the first side wall 1215 in the direction of the second side wall 1216. The stepped recesses of the transversely extending recess 1270 are centered about the cutting blade axis of rotation R and extend inwardly from the first side wall 1215 through and past the longitudinal vertical plane VP of the frame body 1210 toward the second side wall 1216. As can be seen, for example in FIG. 15, the downwardly extending lobe 1280 results in the bottom wall 1220 of the frame body 1210 having a generally sinusoidal shape to provide a portion of the required interior region 1251 for housing the various components of the drive train 1502. A connected interior region 1222 of the frame body includes: a) the frame body through bore 1102 (comprising the connected interface portion through bore 1232 and the support portion through bore 1252) and b) the connected support portion transversely extending recess 1270. The support portion interior region 1251 comprises: a) the support portion through bore 1252 and b) the connected support portion transversely extending recess 1270. The support portion through bore 1252 is defined by an inner surface 1253 which includes: a) an enlarged diameter distal section 1254; b) a smaller diameter intermediate section 1260; and c) an enlarged diameter proximal section 1265.

The enlarged diameter distal section 1254 of the support portion through bore 1252 of the frame body 1210 includes a threaded region 1256 at the distal end of the through bore 1252. The distal threaded region 1256 of the support portion through bore 1252 in proximity to the frame body front wall 1212 receives a threaded cap 1660 of the worm driveshaft support assembly 1640. The threaded cap 1660 of the worm driveshaft support assembly 1640 includes a central opening 1662 defining a cylindrical seating surface 1663. In one exemplary embodiment, the worm driveshaft support assembly 1640 includes a pair of longitudinally spaced apart bearing assemblies 1644, 1654 that support the worm driveshaft 1540 at opposite distal and proximal ends 1562, 1564 of the worm driveshaft 1540. In one exemplary embodiment, the longitudinally spaced apart bearing assemblies 1644, 1654 comprise a first distal needle bearing assembly and a second proximal needle bearing assembly. The seating surface 1663 of the threaded cap 1660 receives and supports the first distal needle bearing assembly 1644. The intermediate section 1260 of the support portion through bore 1252 includes a reduced diameter, necked down region 1262 that defines a cylindrical seating surface 1263 for the second proximal needle bearing assembly 1654 of the worm driveshaft support assembly 1640.

The transversely extending recess 1270 extends into the first side wall 1215 of the frame body 1210 and extends in the horizontal right direction RHD toward the second side wall 1216. The recess 1270 is generally circular and is centered about the cutting blade axis of rotation R. The recess 1270 includes a first, larger diameter cylindrical recess 1272 adjacent the first side wall 1215, a second, intermediate smaller diameter cylindrical recess 1274, and a third, smaller diameter cylindrical recess adjacent the second side wall 1216 of the frame body 1210. The first, larger diameter cylindrical recess 1272 is sized to receive a frame body bearing plate 1360 of the cutting blade assembly 1300. The frame body bearing plate 1360 is generally disk-shaped and includes three peripheral openings 1362. Three fasteners 1364 extend through the peripheral openings 1362 and thread into corresponding openings 1277 formed in a radially extending shoulder surface 1276 between the first and second recesses 1272, 1274 to secure the frame body bearing plate 1360 to the frame body 1210. A first bearing support assembly 1672 of the blade driveshaft support assembly 1670 is supported by the frame body bearing plate 1360. In one exemplary embodiment, the blade driveshaft support assembly 1670 includes a pair of spaced apart first and second bearing support assemblies 1672, 1682.

The first and second bearing support assemblies 1672, 1674 are spaced apart on the blade driveshaft 1570 by the worm gear 1590 affixed to the blade driveshaft 1570. In one exemplary embodiment, the first and second bearing support assemblies 1672, 1674 are rolling bearing assemblies, such as ball bearing assemblies. The second, intermediate diameter cylindrical recess 1274 provides clearance for the worm gear 1590 which rotates with the blade driveshaft 1570 about the blade axis of rotation R. The third, smaller diameter cylindrical recess 1275 defines a cylindrical bearing seating surface 1278 which receives the second bearing support assembly 1682 of the blade driveshaft support assembly 1670. Additionally, the third recess 1275 includes a radially outwardly stepped cylindrical section 1275a which seats a radially extending spacer 1686 of the blade driveshaft support assembly 1670. The spacer 1686 spaces the worm gear 1590 from the second bearing support assembly 1682. The second, right side wall 1216 includes a threaded grease orifice 1282 in fluid communication with the transversely extending recess 1270 to facilitate insert of grease into the region of the drive train 1502 for purposes of lubrication. A grease orifice insert 1290 (FIG. 2) threads into the grease orifice 1282.

Cutting Blade Assembly 1300

As best seen in FIGS. 4-5 and 7-12, the cutting blade assembly 1300 includes the cutting blade 1302 and the frame body bearing plate 1360, as previously described. The cutting blade 1302 is mounted to the blade driveshaft 1570 and rotates with the blade driveshaft 1570, the blade driveshaft 1570 defining the cutting blade axis of rotation R. The cutting blade assembly 1300 also includes an adapter collar 1310, a blade retaining plate 1330, a blade slingplate 1350 and a retaining nut 1340 which is threadedly received on a threaded end region 1574 of a first, reduced diameter distal section 1573 of the blade driveshaft 1570. The first, reduced diameter distal section 1573 of the blade driveshaft 1570 also includes a square shaped outer surface region 1575 adjacent the threaded end region 1574. The adapter collar 1320 includes a square shaped central opening 1326 which is sized to be received on the square shaped outer surface region 1575 of the first, reduced diameter distal section 1573 of the blade driveshaft 1570. The adapter collar 1320 also includes a circular base 1321 and a side projection 1322 extending from the base 1321. An outer periphery of the side projection 1322 of the adapter collar 1320 defines a square 1324 which interfits into a corresponding square cutout 1312 defined by the inner periphery 1304 of the cutting blade 1302 for a positive engagement of the cutting blade 1302 and blade driveshaft 1370 via the square shaped inner and outer surfaces of the adapter collar 1320.

The cutting blade 1302 is sandwiched between the blade retaining plate 1330, which bears against the outer surface 1314 of the blade 1302, and the blade slingplate 1350, which bears against the inner surface 1316 of the blade 1302 as the retaining nut 1340 is tightened on the threaded end region 1574 of the blade driveshaft 1570. The slingplate 1350 include a square central opening 1352 to allow the square side projection 1322 of the adapter collar 1320 to pass through the opening 1352 and be received into the square cutout 1312 of the inner periphery 1304 of the cutting blade 1302.

Drive Mechanism 1500

In one exemplary embodiment of the present disclosure the drive mechanism 2500 includes the drive train 1502, which is supported for rotation by the driveshaft support assembly 1600. In one exemplary embodiment, as best seen in FIGS. 3 and 8-12, the drive train 1502 includes the worm gear drive arrangement 1504, for rotatably driving the cutting blade 1302, mounted on the interconnected set of drive shafts 1506 operatively coupled between the driver shaft 2270 of the driver assembly 2200 and the cutting blade 1302. In one exemplary embodiment, the driveshaft support assembly 1600 includes the adapter driveshaft support assembly 1610, the worm driveshaft support assembly 1640 and the blade driveshaft support assembly 1670. Advantageously, each of the driveshaft support assemblies 1610, 1640, 1670 each include a pair of longitudinally spaced apart bearing support assemblies which are advantageously are located about a longitudinal center point of each of the respective driveshafts 1510, 1540, 1570 to provide for additional stability in the bearing support afforded by the assemblies 1610, 1640, 1670. Each of the three bearing supports assemblies 1610, 1640, 1670 provide for improved rotational support of their respective drive shafts 1510, 1540, 1570, less chatter and/or undesirable radial movement of the respective drive shafts 1510, 1540, 1570 under certain load conditions, as opposed to using a single bearing support means. Chatter and undesirable radial movement of the driveshafts 1510, 1540, 1570 would be typically experienced by the operator as undesirable vibration of the power operated scribe saw 1000, premature component wear, and/or excessive heating of components. In one exemplary embodiment, the first and second bearing support assemblies 1612, 1614 of the adapter driveshaft support assembly 1610 are ball bearing support assemblies; the first and second bearing support assemblies 1644, 1654 of the worm driveshaft support assembly 1640 are needle bearings; and the first and second bearing support assembly 1672, 1682 of the blade driveshaft support assembly 1670 are ball bearing support assemblies. In lieu of ball bearing and/or needle bearing support assemblies, as would be recognized by one of skill in the art, other bearing support structures and configuration may be utilized such as sleeve bushings.

The set of drive shafts 1506, in one exemplary embodiment, includes the adapter driveshaft 1510, the worm driveshaft 1540 and the blade driveshaft 1570. Unlike the worm driveshaft 1540 and the blade driveshaft 1570, the adapter driveshaft 1610 is supported by a support assembly 1610 disposed in the handle extension 1120 of the handle assembly 1100. The worm driveshaft 1540 and the blade driveshaft 1570 are both supported by respective support assemblies 1640, 1670 seated within the frame body 1210 or seated within components supported by the frame body 1210. The adapter driveshaft 1510, which is a component of the longitudinally extending driveshaft assembly 1508 and rotates about the longitudinal drive shaft assembly axis of rotation LDR, is generally cylindrical and includes a smaller diameter distal section 1530 and an enlarged diameter proximal section 1532. The outer surface of the adapter driveshaft 1510 includes a radially extending shoulder 1534 between the distal and proximal sections 1530, 1532. The shoulder 1534 provides a positive stop for the second proximal bearing support assembly 1614 of the adapter driveshaft support assembly 1610. The proximal portion 1513 of the adapter driveshaft 1510 is disposed within the handle extension 1120 of the handle assembly 1100, while a distal portion 1515 of the adapter driveshaft extends forwardly into the through bore 1252 of the support portion 1250 of the frame body 1250. The adapter driveshaft 1510 includes a proximal end 1512 which defines the driven fitting 1520, while the distal end 1514 of the adapter driveshaft 1510 includes the drive fitting 1522. The drive fitting 2276 at the distal end portion 2274 of the driver shaft 2270 of the driver assembly 2200 engages and interfits with the driven fitting 1520 of the adapter driveshaft 1510 of the longitudinally extending driveshaft assembly 1508 to drive the drive train 1502 of the drive mechanism 1500 and rotate the cutting blade 1302 about it axis of rotation R. The longitudinal drive shaft assembly axis of rotation LDR of the adapter driveshaft 1510 (and the worm driveshaft 1540) is coincident/coaxial with the driver shaft axis of rotation DSR, as explained above. The drive fitting 1522 of the adapter driveshaft 1510 engages the driven fitting 1550 at the proximal end 1564 of the worm driveshaft 1540 such that the adapter and worm driveshafts 1510, 1540 rotate in unison about the longitudinal drive shaft assembly axis of rotation LDR.

The worm driveshaft 1540 which is part of the longitudinally extending driveshaft assembly 1508 is the longest driveshaft (in longitudinal extent) of the set of interconnected driveshafts 1506. Advantageously, to minimize undesirable vibration during operation of the scribe saw 1000, the worm driveshaft support assembly 1640, in one exemplary embodiment, provides radial bearing support at both the distal end 1562 and proximal end 1564 of the driveshaft 1540. The worm driveshaft 1540 is generally cylindrical and includes a distal section 1542, an intermediate section 1544 and a reduced diameter proximal section 1548. The distal section 1542 of the worm driveshaft 1540 is received the first needle bearing assembly 1644. The intermediate section 1544 of the worm driveshaft 1540 includes a rearward cylindrical region 1545 and a forward part including the worm 1560 which extends radially outwardly from the cylindrical region 1545. In one exemplary embodiment, the worm 1560 is integral with the intermediate section 1544 of the worm driveshaft 1540, that is the worm 1560 and worm driveshaft 1540 are fabricated as a single unitary, one-piece structure. However, it should be appreciated that the worm 1560 may be fabricated as a separate component that is pinned to the intermediate section 1540 of the worm driveshaft 1540. The proximal section 1548 of the worm driveshaft 1540 defines the driven fitting 1550 adjacent the proximal end 1564 of the worm driveshaft 1540. The driven fitting 1550 is received in the drive fitting 1522 of the adapter driveshaft 1510 so the driveshafts 1510, 1540 rotation in unison.

Additionally, to inhibit longitudinal movement of the worm driveshaft 1540, the worm driveshaft support assembly 1640, in one exemplary embodiment, includes a thrust bearing 1657. A radially extending shoulder 1264 of the intermediate section 1260 of the through bore 1252 of the frame body support portion 1250 provides a seating surface for the thrust bearing 1657. The thrust bearing 1657 bears a radial shoulder 1561 at a proximal end of the worm 1560 to inhibit longitudinal movement of the worm driveshaft 1540 in the rearward direction RW. The threaded cap 1660 includes the central opening defines the cylindrical seating surface 1663 which receives and supports the first distal needle bearing assembly 1644. The cap 1660 includes a threaded outer surface 1664 that threads into the threaded region 1256 defined in the inner surface 1253 at the distal end 1255 of the support portion through bore 1252. The cap 1660 includes a hex head 1666 to facilitate tightening the cap 1660 into the threaded region 1256 of the inner surface 1253 of the support portion through bore 1252 of the frame body 1210. The central opening 1662 of the cap 1660 is partially defined by a vertical back wall 1668. The back wall 1668 of the cap 1660 functions as a stop to inhibit longitudinal movement of the worm driveshaft 1540 (and the longitudinally extending driveshaft assembly 1508) in the forward direction FW.

The blade driveshaft 1570 supports the blade assembly 1300 and defines the axis of rotation R of the cutting blade 1302. The blade driveshaft 1570 extends between a first distal end 1571 and a second proximal end 1572 and includes an outer surface 1589. Because of a desire to minimize the "footprint" of the frame housing 1210 in the horizontal direction, the blade driveshaft 1570 is the shortest in length of the three driveshafts 1510, 1540, 1570 of the set of driveshafts 1506. While the blade driveshaft 1570 is coupled to and supported by the frame body support portion 1250, a distal portion 1576 of the shaft 1570 extends outwardly beyond the first side wall 1215 of the frame body 1210. The blade driveshaft 1570 includes the first, reduced diameter distal section 1573 and a second, enlarged diameter proximal section 1580. As noted previously, the first, reduced diameter distal section 1573 of the blade driveshaft 1570 includes the threaded end region 1574 adjacent the distal end 1571 that receives the retaining nut 1340 of the blade assembly 1300 to secure the blade assembly 1300 to the blade driveshaft 1570. Additionally, the outer surface 1589 in the first, reduced diameter distal section 1573 of the blade driveshaft 1570 includes the squared-shaped region 1575 that receives the corresponding square-shaped central opening 1326 of the adapter collar 1320 of the blade assembly 1300.

The worm gear 1590 includes a central opening 1592 sized to be received on the second, enlarged diameter proximal section 1580 of the driveshaft 1570. The central opening includes a radially outwardly extending notch 1594. The outer surface 1589 of the blade driveshaft 1570 in the second, enlarged diameter proximal section 1580 includes a corresponding notch 1585. When aligned, the notches 1594, 1585 receive a key 1599 that functions to pin the worm gear 1590 to the second, enlarged diameter proximal section 1580 of the blade driveshaft 1570 so that they rotate in unison. The outer surface 1589 of the blade driveshaft 1570 in the second, enlarged diameter proximal section 1580 also includes an annular groove 1582 that is sized to receive a retainer ring 1684 of the blade driveshaft support assembly 1670 that spaces the worm gear 1590 from the first bearing support assembly 1672 of the blade driveshaft support assembly 1670 and inhibits movement of the worm gear 1590 in the left horizontal direction LHD, that is, in a horizontal direction toward the cutting blade 1302. The outer surface 1589 of the blade driveshaft 1570 in the second, enlarged diameter proximal section 1580 of the blade driveshaft 1570 the includes a pair of spaced apart, cylindrical seating surfaces 1583, 1584 on opposite sides of the worm gear 1590 that receive and seat the first and second bearing support assemblies 1672, 1682 of the blade driveshaft support assembly 1670. The radially extending spacer 1686 spaces the worm gear 1590 from the second bearing support assembly 1682 and inhibits movement of the worm gear 1590 in the right horizontal direction RHD, that is, in a horizontal direction toward the second side wall 1216 of the frame body 1210. Rotation of the worm driveshaft 1540 and the worm 1560 affixed thereto about the longitudinal driveshaft assembly axis of rotation LDR, in turn, helically drives the operatively engaged worm wheel or worm wheel 1590 and the blade driveshaft 1570 affixed thereto and the cutting blade 1302 affixed to the blade driveshaft 1570 for concomitant rotation about the cutting blade axis of rotation R. The longitudinal driveshaft assembly axis of rotation LDR is aligned with and coaxial with the handle assembly longitudinal axis LA and the driver shaft axis of rotation DSR. The cutting blade axis of rotation R is orthogonal to and offset vertically from the longitudinal driveshaft assembly axis of rotation LDR, the handle assembly longitudinal axis LA and the driver shaft axis of rotation DSR and is orthogonal to and intersects the vertical plane VP of the frame body 1210.

In one exemplary embodiment, the handle assembly 1100 may be fabricated of plastic or other material or materials known to have comparable properties and may be formed by molding and/or machining. The frame body 1210 may be fabricated of aluminum or stainless steel or other material or materials known to have comparable properties and may be formed/shaped by casting and/or machining Components of the cutting blade assembly 1302 and the drive mechanism 1500 may be fabricated of a hardenable grade of alloy steel or a hardenable grade of stainless steel, or other material or materials known to have comparable properties and may be formed/shaped by machining, forming, casting, forging, extrusion, metal injection molding, additive manufacturing and/or electrical discharge machining or another suitable process or combination of processes.

Second Exemplary Embodiment—Power Operated Scribe Saw Assembly 2999 with Blade Guard 4000

Figure 16:
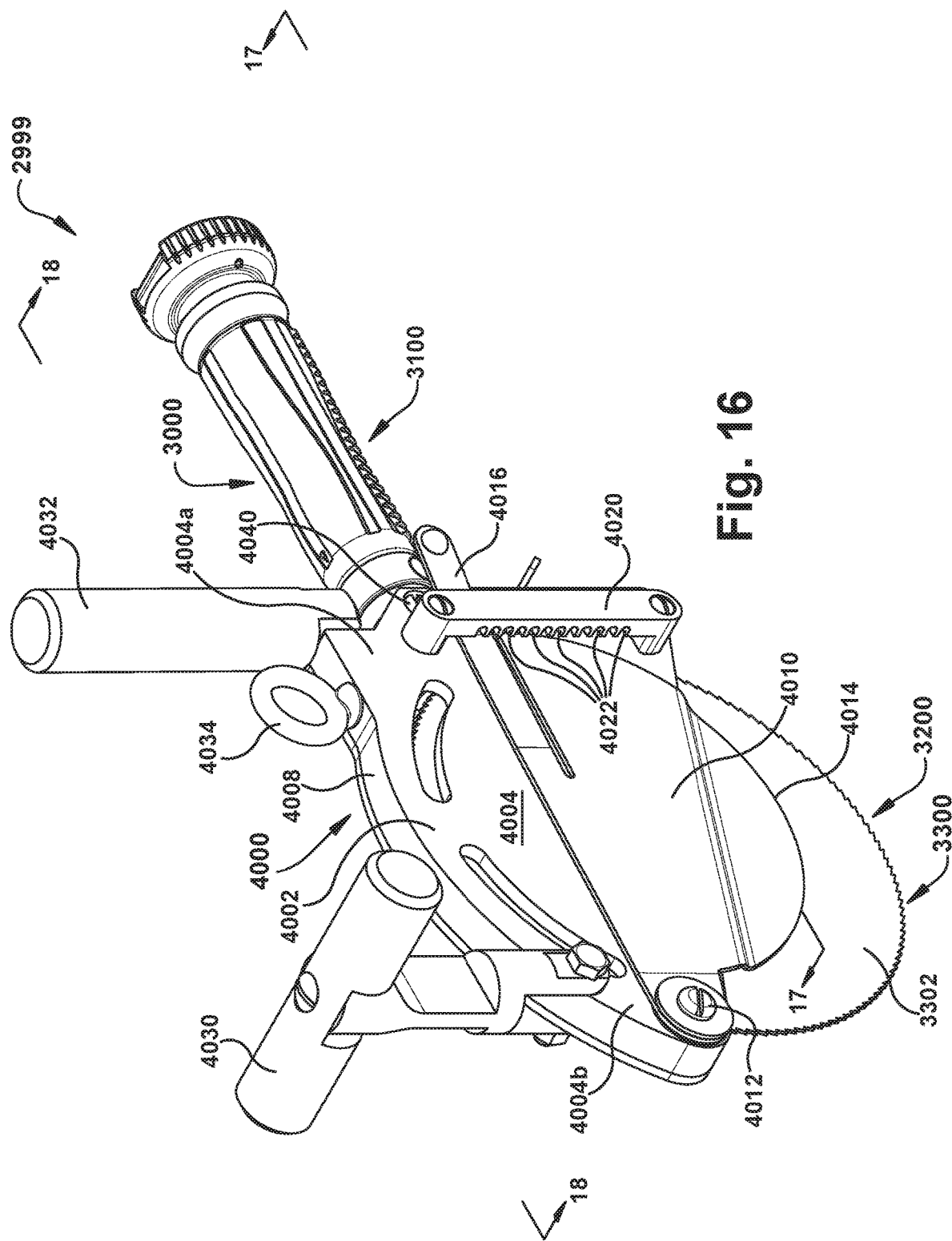
FIG. 16 is a schematic front perspective view of a second exemplary embodiment of a power operated scribe saw assembly of the present disclosure including the power operated scribe saw of FIG. 1 and an adjustable depth of cut blade guard.
Figure 17:
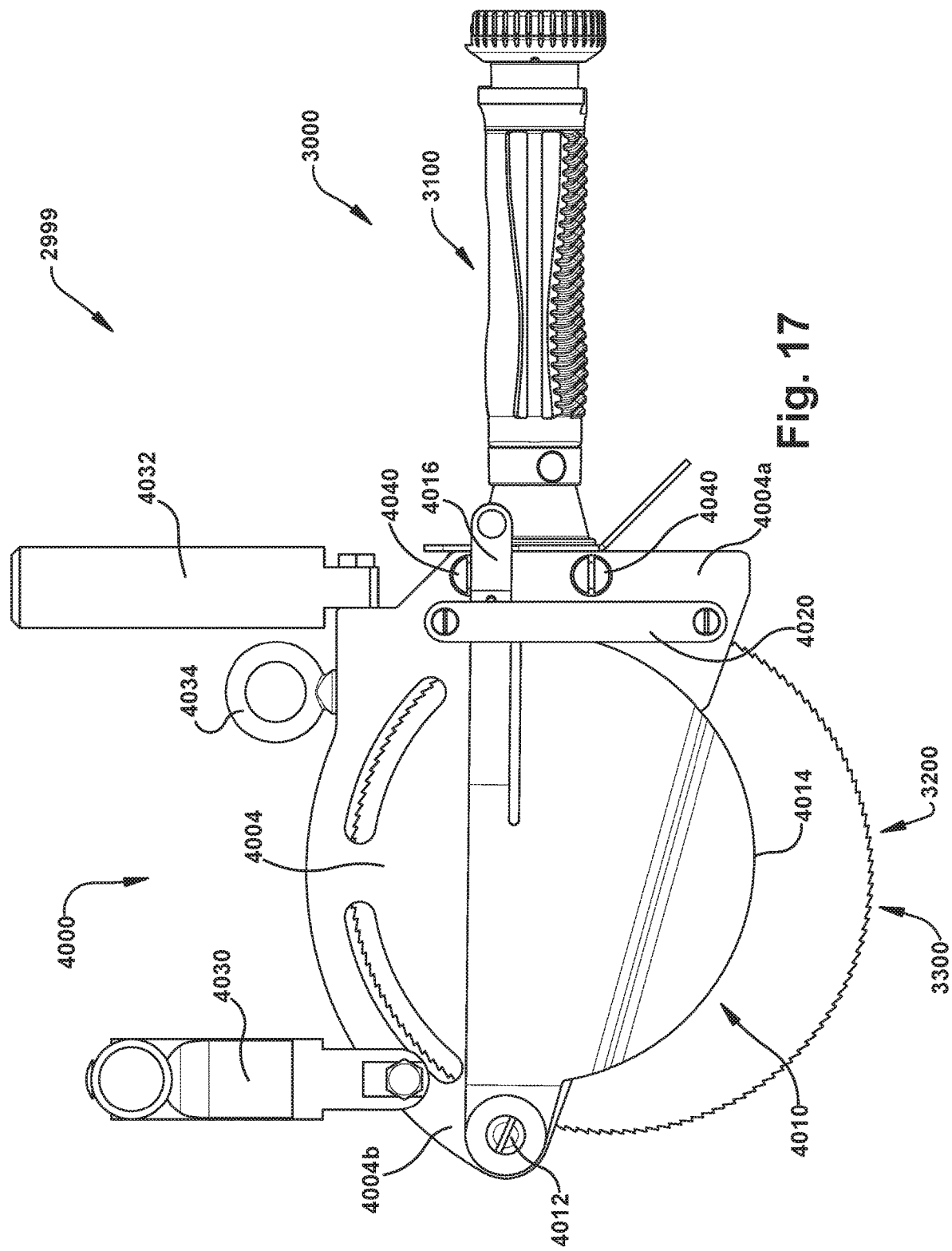
FIG. 17 is a schematic side elevation view of the power operated scribe saw assembly of FIG. 16, as seen from a plane indicated by the line 17-17 in FIG. 16.
Figure 18:
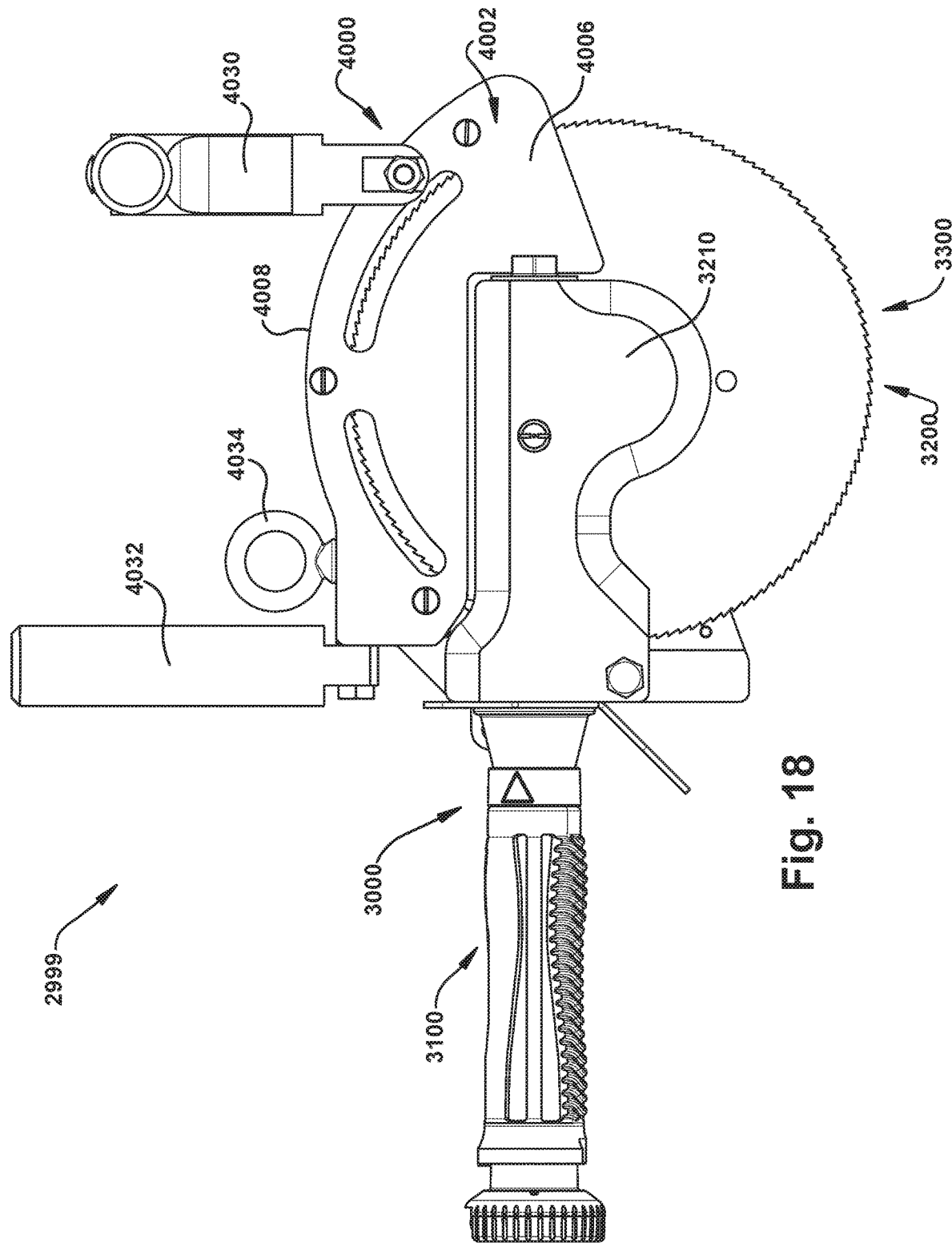
FIG. 18 is a schematic side elevation view of the power operated scribe saw assembly of FIG. 16, as seen from a plane indicated by the line 18-18 in FIG. 16.

A second exemplary embodiment of the power operated scribe saw assembly of the present disclosure is schematically depicted generally at 2999 in FIGS. 16-18. The power operated scribe saw assembly 2999 includes a scribe saw 3000, similar to the power operated scribe saw 1000 of the first exemplary embodiment, and an adjustable depth of cut blade guard 4000. The power operated scribe saw 3000 includes a handle assembly 3100, similar in structure and function to the handle assembly 1100 of the scribe saw 1000, a head assembly 3200, including a cutting blade assembly 3300 and a frame body 3210, similar in structure and function to the head assembly 1200, including the cutting blade assembly 1300 and frame body 1210, of the power operated scribe saw 1000.

The adjustable depth of cut blade guard 4000 is affixed to the frame body 3212. The blade guard 4000 includes a guard body 4002, which envelopes or encloses an upper portion of the cutting blade 3302. The guard body 4002 includes a first side wall 4004 and a second side wall 4006 separated by a top wall 4008. The guard body 4002 is affixed to the frame body 3210 of the scribe saw 3000 via a pair of fasteners 4040 which extend through a rearward or proximal portion 4006 of the side wall 4004 and thread into a corresponding pair of openings in the first side wall of the frame body 3210. The pair of openings are schematically shown as the pair of vertically openings 1248 in, for example, in FIG. 15 of the frame body 1210 of the power operated scribe saw 1000 of the first exemplary embodiment In one exemplary embodiment, the blade guard 4000 additionally includes a pivoting depth gauge 4010 and a depth gauge index 4020. The depth gauge 4010 is pivotally coupled to the body 4002 by a pivot pin 4012 and includes a semicircular lower periphery 4012 that determines the depth of cut of the cutting blade 3302. The depth gauge index 4020 is affixed in a vertical orientation to a rearward or proximal portion 4004*a* of the first side wall 4004 of the guard body 4002. An extending arm 4012 of the depth gauge 4010 interfits with a selected one of a plurality of indentations or slots 4022 defined by the depth gauge index 4020. Advantageously, the operator can adjust the depth of cut of the cutting blade 3302 to a desired depth by pivoting the extending arm 4016 (and thereby pivoting the depth gauge 4010 about the pivot pin 4012) to interfit with a selected one of the plurality of indentations or slots 4022.

In one exemplary embodiment, the body 4002 of the blade guard 4000 advantageously further provides for two additional handles 4030, 4032 that can be selectively used by the operator to manipulate or position the power operated scribe saw 2999 in performing certain cutting or trimming tasks. The first handle 4030 is a T-shaped handle extending upwardly from a front or distal portion 4004b of the body 4002, while the second handle 4032 is a post handle extending upwardly from a proximal end wall 4004 of the body 4002. An eye bolt 4034 is affixed to an upper wall 4005 of the body 4002. The eye bolt 4034 provides an attachment coupling for a cable or chain (not shown) for suspending the power operated scribe saw 2999 in a desired position or at a desired height for repetitive cutting and trimming purposes. The cable or chain advantageously assists the operator by bearing the weight of the power operated scribe saw 2999 and/or positioning the scribe saw 2999 in a desired position or at a desired height for repetitive cutting and trimming operations thereby mitigating operator fatigue and/or improving operator productivity.

In one exemplary embodiment, the components of power operated scribe saw 3000 may be fabricated of the materials enumerated with regard to the components of the power operated scribe saw 1000 of the first exemplary embodiment. The adjustable depth of cut guard 4000 may be fabricated of plastic or other material or materials known to have comparable properties and may be formed by molding and/or machining. Alternatively, the guard 4000 may be fabricated of aluminum or stainless steel or other material or materials known to have comparable properties and may be formed/shaped by casting and/or machining.

Annular, as used herein, means generally ring-like or generally ring-shaped in configuration and includes configuration wherein the ring includes or does not include a split extending through a diameter of the ring or annulus. Axially above or axially spaced above, as used herein, means positioned above as viewed with respect to an axis, for example, the handle assembly longitudinal axis LA, even if the two elements are not in axial alignment with respect to the axis. Similarly, the terms axially below or axially spaced below, as used herein, means positioned below as viewed with respect to an axis, even if the two elements are not in axial alignment with respect to the axis. Axially extending, as used here, means one element extends from and is positioned above or below a second element with respect to an axis, even if the two elements are not in axial alignment with respect to the axis. Similarly, the terms radially offset from, radially outward of, radially inward of, as used herein, means one element is positioned offset from a second element, as viewed along a radius line extending radially from an axis, even if the two elements are not in radial alignment along the radius line.

As used herein, terms of orientation and/or direction such as front, rear, forward, rearward, distal, proximal, distally, proximally, upper, lower, inward, outward, inwardly, outwardly, upwardly, downwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure or invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A power operated tool comprising:
an elongated handle assembly extending along a longitudinal axis of the handle assembly;
a head assembly coupled to the handle assembly, the head assembly including a frame body, a drive train and a cutting blade assembly, including a cutting blade rotatably driven by the drive train about a cutting blade axis of rotation;
the drive train comprising:
a worm screw driveshaft rotating about a longitudinal drive shaft assembly axis of rotation, the worm screw driveshaft having a proximal end and a distal end;
a worm screw extending radially from and rotating with the worm screw driveshaft, the worm screw positioned intermediate the proximal and distal ends of the worm screw driveshaft;
a blade driveshaft including a first end and a second end and rotating about the cutting blade axis of rotation, the cutting blade coupled to and rotating with the blade driveshaft;
a worm gear extending radially from and rotating with the blade driveshaft, the worm screw and worm gear operatively coupled such that rotation of the worm screw driveshaft about the longitudinal drive shaft assembly axis of rotation causes rotation of the blade driveshaft, the worm gear and cutting blade about the cutting blade axis of rotation;
the frame body including a first side wall and a second side wall spaced apart by a front wall and a back wall, a through bore extending along a frame body longitudinal axis and a transversely extending recess extending into the first side wall in a direction toward the second side wall and opening into the through bore;
a worm screw driveshaft support assembly disposed within the through bore and supporting the worm screw driveshaft for rotation about the longitudinal drive shaft assembly axis of rotation and including a first bearing support engaging at least a portion of the worm screw driveshaft extending between the distal end of the worm screw driveshaft and the worm screw and a second bearing support engaging at least a portion of the worm screw driveshaft extending between the proximal end of the worm screw driveshaft and the worm screw wherein a distal end of the through bore of the frame body is sized to receive a cap, the cap including a cylindrical seating surface which receives and supports the first bearing support; and
a blade driveshaft support assembly supporting the blade driveshaft for rotation about the cutting blade axis of rotation.

2. The power operated tool of claim 1 wherein the power operated tool is a scribe saw and the cutting blade is a circular saw blade.

3. The power operated tool of claim 1 wherein the through bore extends through the front and back walls of the frame body and the cap includes a central opening defining the cylindrical seating surface of the cap.

4. The power operated tool of claim 1 wherein the through bore extends between the front and back walls and includes a cylindrical seating surface spaced from the front wall and the back wall and the second bearing support of the worm screw driveshaft support assembly is seated on the cylindrical seating surface of the through bore.

5. The power operated tool of claim 1 wherein the blade driveshaft support assembly includes a first bearing support assembly engaging at least a portion the blade driveshaft extending between the cutting blade assembly and the worm gear and a second bearing support assembly engaging at least a portion of the blade driveshaft extending between the second end of the blade driveshaft and the worm gear.

6. The power operated tool of claim 5 wherein the transversely extending recess of the first wall includes a plurality of cylindrical recesses each recess of the plurality of cylindrical recesses having a different diameter, one cylindrical recess of the plurality of cylindrical recesses including a cylindrical seating surface, the second bearing support assembly of the blade driveshaft support assembly is seated on the cylindrical seating surface of the one cylindrical recess of the plurality of cylindrical recesses.

7. The power operated tool of claim 6 wherein the cutting blade assembly includes a frame body bearing plate received in a cylindrical recess of the plurality of cylindrical recesses, the frame body bearing plate including a cylindrical seating surface, the second bearing support assembly of the blade driveshaft support assembly seated on the cylindrical seating surface of the frame body bearing plate.

8. The power operated tool of claim 1 wherein the drive train further includes an adapter driveshaft operatively coupled to the proximal end of the worm screw driveshaft for rotation with the worm screw driveshaft about the longitudinal drive shaft assembly axis of rotation and the elongated handle assembly including a handle assembly through bore extending along the longitudinal axis of the handle assembly, the handle assembly through bore aligned with and opening into the through bore of the frame body, the handle assembly including a handle extension at a forward end of the handle assembly, a distal portion of the handle extension being received in the through bore of the frame body, a section of the handle assembly through bore extending through the handle extension including a cylindrical seating region, an adapter driveshaft support assembly supporting the adapter driveshaft for rotation about the longitudinal drive shaft assembly axis of rotation being seated in the cylindrical seating region of the handle extension.

9. The power operated tool of claim 8 wherein the adapter driveshaft support assembly includes a first bearing support assembly and a second bearing support assembly engaging longitudinally spaced apart sections of the adapter driveshaft.

10. A power operated tool comprising:
an elongated handle assembly extending along a longitudinal axis of the handle assembly;
a head assembly coupled to the handle assembly, the head assembly including a frame body, a drive train and a cutting blade assembly, including a cutting blade rotatably driven by the drive train about a cutting blade axis of rotation;
the drive train comprising:
a worm screw driveshaft rotating about a longitudinal drive shaft assembly axis of rotation, the worm screw driveshaft having a proximal end and a distal end;
a worm screw rotating with the worm screw driveshaft, the worm screw positioned intermediate the proximal and distal ends of the worm screw driveshaft;
a blade driveshaft including a first end and a second end and rotating about the cutting blade axis of rotation, the cutting blade coupled to and rotating with the blade driveshaft;
a worm gear rotating with the blade driveshaft, the worm screw and worm gear operatively coupled such that rotation of the worm screw driveshaft about the longitudinal drive shaft assembly axis of rotation causes rotation of the blade driveshaft, the worm gear and cutting blade about the cutting blade axis of rotation;
the frame body including a first side wall and a second side wall spaced apart by a front wall and a back wall, a through bore extending along a frame body longitudinal axis and a transversely extending recess extending into the first side wall in a direction toward the second side wall and opening into the through bore;
a worm screw driveshaft support assembly supporting the worm screw driveshaft for rotation about the longitudinal drive shaft assembly axis of rotation and including a first bearing support engaging at least a portion of the worm screw driveshaft extending between the distal end of the worm screw driveshaft and the worm screw and a second bearing support and engaging at least a portion of the worm screw driveshaft extending between the proximal end of the worm screw driveshaft and the worm screw wherein a distal end of the through bore of the frame body is sized to receive a cap, the cap including a longitudinally extending seating surface which receives and supports the first bearing support.

11. The power operated tool of claim 10 wherein the power operated tool is a scribe saw and the cutting blade is a circular saw blade.

12. The power operated tool of claim 10 wherein the through bore extends through the front and back walls of the frame body and the cap includes a central opening defining the longitudinally extending seating surface of the cap.

13. The power operated tool of claim 10 wherein the through bore extends between the front and back walls of the frame body and includes a cylindrical seating surface spaced from the front wall and the back wall and the second bearing support of the worm screw driveshaft support assembly is seated on the cylindrical seating surface of the through bore.

14. The power operated tool of claim 10 further including a blade driveshaft support assembly supporting the blade driveshaft for rotation about the cutting blade axis of rotation wherein the blade driveshaft support assembly includes a first bearing support assembly engaging at least a portion the blade driveshaft extending between the cutting blade assembly and the worm gear and a second bearing support assembly engaging at least a portion of the blade driveshaft extending between the second end of the blade driveshaft and the worm gear.

15. The power operated tool of claim 14 wherein the transversely extending recess of the first wall includes a plurality of cylindrical recesses each recess of the plurality of cylindrical recesses having a different diameter, one cylindrical recess of the plurality of cylindrical recesses including a cylindrical seating surface, the second bearing support assembly of the blade driveshaft support assembly seated on the cylindrical seating surface of the one cylindrical recess of the plurality of cylindrical recesses.

16. The power operated tool of claim 15 wherein the cutting blade assembly includes a frame body bearing plate received in a cylindrical recess of the plurality of cylindrical recesses, the frame body bearing plate including a cylindrical seating surface, the second bearing support assembly of the blade driveshaft support assembly is seated on the cylindrical seating surface of the frame body bearing plate.

17. The power operated tool of claim 10 wherein the drive train further includes an adapter driveshaft operatively coupled to the proximal end of the worm screw driveshaft for rotation with the worm screw driveshaft about the longitudinal drive shaft assembly axis of rotation, the handle assembly including a handle assembly through bore extending along the longitudinal axis of the handle assembly, the handle assembly through bore aligned with and opening into the through bore of the frame body, the handle assembly including a handle extension at a forward end of the handle assembly, a distal portion of the handle extension being received in the through bore of the frame body, a section of the handle assembly through bore extending through the handle extension including a cylindrical seating region, an adapter driveshaft support assembly supporting the adapter driveshaft for rotation about the longitudinal drive shaft assembly axis of rotation being seated in the cylindrical seating region of the handle extension.

18. The power operated tool of claim 17 wherein the adapter driveshaft support assembly includes a first bearing support assembly and a second bearing support assembly engaging longitudinally spaced apart sections of the adapter driveshaft.

19. The power operated tool of claim 10 wherein the worm screw and the worm screw driveshaft are fabricated as a unitary one-piece structure.

20. A power operated tool comprising:
an elongated handle assembly extending along a longitudinal axis of the handle assembly;
a head assembly coupled to the handle assembly, the head assembly including a frame body, a drive train and a cutting blade assembly, including a cutting blade rotatably driven by the drive train about a cutting blade axis of rotation;
the drive train comprising:
a worm screw driveshaft rotating about a longitudinal drive shaft assembly axis of rotation, the worm screw driveshaft having a proximal end and a distal end;
a worm screw rotating with the worm screw driveshaft, the worm screw positioned intermediate the proximal and distal ends of the worm screw driveshaft;
a blade driveshaft including a first end and a second end and rotating about the cutting blade axis of rotation, the cutting blade coupled to and rotating with the blade driveshaft;
a worm gear rotating with the blade driveshaft, the worm screw and worm gear operatively coupled such that rotation of the worm screw driveshaft about the longitudinal drive shaft assembly axis of rotation causes rotation of the blade driveshaft, the worm gear and cutting blade about the cutting blade axis of rotation;
the frame body including a first side wall and a second side wall spaced apart by a front wall and a back wall, a through bore extending along a frame body longitudinal axis and a transversely extending recess extending into the first side wall in a direction toward the second side wall and opening into the through bore;
a worm screw driveshaft support assembly supporting the worm screw driveshaft for rotation about the longitudinal drive shaft assembly axis of rotation and including a first bearing support engaging at least a portion of the worm screw driveshaft extending between the distal end of the worm screw driveshaft and the worm screw and a second bearing support and engaging at least a portion of the worm screw driveshaft extending between the proximal end of the worm screw driveshaft and the worm screw, wherein the through bore extends between the front and back walls and includes a cylindrical seating surface spaced from the front wall and the back wall and the second bearing support of the worm screw driveshaft support assembly is seated on the cylindrical seating surface of the through bore; and
a blade driveshaft support assembly supporting the blade driveshaft for rotation about the cutting blade axis of rotation.

\* \* \* \* \*